(12) United States Patent
Wernlund et al.

(10) Patent No.: US 8,057,120 B2
(45) Date of Patent: Nov. 15, 2011

(54) CORNER JOINING OF STRUCTURAL MEMBERS

(75) Inventors: Chad Wernlund, Baldwin, WI (US); Mike Schmidt, Coon Rapids, MN (US); Frank Campbell, Lake Elmo, MN (US)

(73) Assignee: Andersen Corporation, Bayport, MN (US)

( * ) Notice: Subject to any disclaimer, the term of this patent is extended or adjusted under 35 U.S.C. 154(b) by 390 days.

(21) Appl. No.: 11/850,785

(22) Filed: Sep. 6, 2007

(65) Prior Publication Data

US 2008/0063468 A1  Mar. 13, 2008

Related U.S. Application Data

(60) Provisional application No. 60/842,720, filed on Sep. 7, 2006.

(51) Int. Cl.
*F16B 7/08* (2006.01)

(52) U.S. Cl. ........ 403/187; 403/264; 403/280; 403/295; 403/329; 403/DIG. 14

(58) Field of Classification Search ............... 403/187, 403/264, 42, 251, 252, 255, 280, 291–295, 403/297, 298, 309, 313, 314, 329, 397, DIG. 11, 403/DIG. 14, 2, 242; 52/645, 656.9, 665, 52/750

See application file for complete search history.

(56) References Cited

U.S. PATENT DOCUMENTS

| | | | |
|---|---|---|---|
| 3,561,801 A * | 2/1971 | Chiu | 403/264 |
| 3,642,310 A * | 2/1972 | Hudson | 403/219 |
| 3,643,989 A | 2/1972 | Sattler | |
| 3,778,175 A * | 12/1973 | Zimmer | 403/187 |
| 3,811,785 A * | 5/1974 | Hagglund | 403/264 |
| 3,850,534 A * | 11/1974 | O'Halloran | 403/264 |
| 4,898,493 A * | 2/1990 | Blankenburg | 403/DIG. 14 |
| 5,271,687 A * | 12/1993 | Holka et al. | 403/233 |
| 5,461,837 A * | 10/1995 | Chaney et al. | 403/264 |
| 5,875,600 A | 3/1999 | Redman | |
| 6,427,858 B2 * | 8/2002 | Sabounjian | 211/202 |
| 6,851,244 B2 | 2/2005 | Vilhauer | |
| 2005/0008430 A1 * | 1/2005 | Kahl | 403/231 |
| 2005/0235596 A1 | 10/2005 | Pegorado | |

FOREIGN PATENT DOCUMENTS

JP  2003-269420  9/2003

* cited by examiner

*Primary Examiner* — Victor MacArthur
(74) *Attorney, Agent, or Firm* — Womble Carlyle Sandridge & Rice PLLC

(57) ABSTRACT

A structure for joining structural members is disclosed. The structure joins an end of a first member to a side of a second member by a coupling insert. The coupling insert has a web coupling portion that is received by the end of the first member and a tenon portion that is received by a transverse opening in the side of the second member. The web coupling portion and the tenon portion are connected by a base plate.

26 Claims, 30 Drawing Sheets

CORNER JOINING OF STRUCTURAL MEMBERS

RELATED APPLICATIONS

This application claims the benefit of U.S. Provisional Application No. 60/842,720 filed Sep. 7, 2006.

FIELD OF THE INVENTION

The present invention relates generally to methods for joining lineal structural members, and, more particularly, to joining the corners of structural members for use in fenestration, such as windows and doors.

BACKGROUND OF THE INVENTION

The advantages of hollow lineal structural members for use in fenestration are well known. For example, economically produced window sashes made from hollow extrusions of polymeric materials, such as PVC, provide adequate strength and appearance for many applications. A hollow extruded polymeric lineal member requires less material than would a comparable solid member, yet in many cases still provides adequate structural strength. In addition, once the extrusion die is in place, lineal members having even the most complex cross sectional profiles can be produced at a high rate, with relatively little waste. When greater structural strength is needed, as might occur in door panels, for example, reinforced polymeric materials, such as glass fiber reinforced hollow pultrusions, can be used.

The advantages of hollow polymeric lineals notwithstanding, the use of members made from such materials has presented some challenges, particularly in joining of such members to form a complete structure. This has been especially true in the joining of hollow pultruded members, since an advantage of pultruded members is that they can be made with relatively thin walls. Additionally, pultruded members typically utilize thermosetting polymers, which often tend to be brittle, and are typically not weldable. As a result, pultruded members may not be readily fastenable by conventional mechanical fasteners. In cases where a mitered corner can be used, right angle inserts, or corner keys, have proven useful. The corner keys are inserted into the ends of the lineal members and attached to the members by adhesives, mechanical fasteners, or combinations thereof. There are cases, however, in which mitered joints are not desirable. For example, it is often desirable to produce a fenestration component, such as a door panel or a window sash, from hollow structural members that maintain a traditional wood appearance, more specifically, the appearance of a wooden structure joined by mortise and tenon joints.

SUMMARY OF THE INVENTION

The present invention provides a system for joining hollow structural members in a mortise and tenon manner. The system is particularly useful for joining thin walled lineal polymeric members, in particular pultruded lineal members, wherein a high level of joint strength and closeness of fit is required. In forming a joint according to the present invention, an end portion of a first lineal structural member is abutted to a side portion of a second lineal structural member. Joining is accomplished by the use of a coupling member in the form of an insert having a base plate adapted to engage the internal profile of the first structural member, with a first, internal, web attachment portion attached to a first side of the base plate and a second, external, tenon portion, attached to a second side of the base plate. The first structural member is adapted to receive, in one end, the first web attachment portion of the insert, while the second structural member is adapted to receive the tenon portion of the insert through one or more transverse, mortise-like, openings.

Particularly useful embodiments of the system are those in which the second lineal structural member has a cross sectional profile comprising features such as channels or projections with which the mating end of the first member can be fabricated to fit. The first structural member may further comprise one or more internal longitudinal webs adapted to receive the attachment portions of the insert member. The attachment portions of the insert member, along with the receiving portions of the first structural member, are adapted to provide a maximum load bearing area, with a minimum of stress concentration, thereby increasing the load bearing capacity of the joint. A particularly useful insert is one having a hook-like first attachment portion that is resiliently moveable so as to allow it to hook into an opening in an internal web of the first lineal member.

It will be understood that while the embodiments disclosed herein involve lineal members, other types of members can also be joined, provided they incorporate the appropriate hollow spaces for receiving and engaging the coupling inserts. As used herein, the term hollow member will refer to a member having hollow portions in areas that receive coupling inserts. Such members may have other portions, not involved with the coupling inserts, that are not hollow.

DETAILED DESCRIPTION

Figure 1:
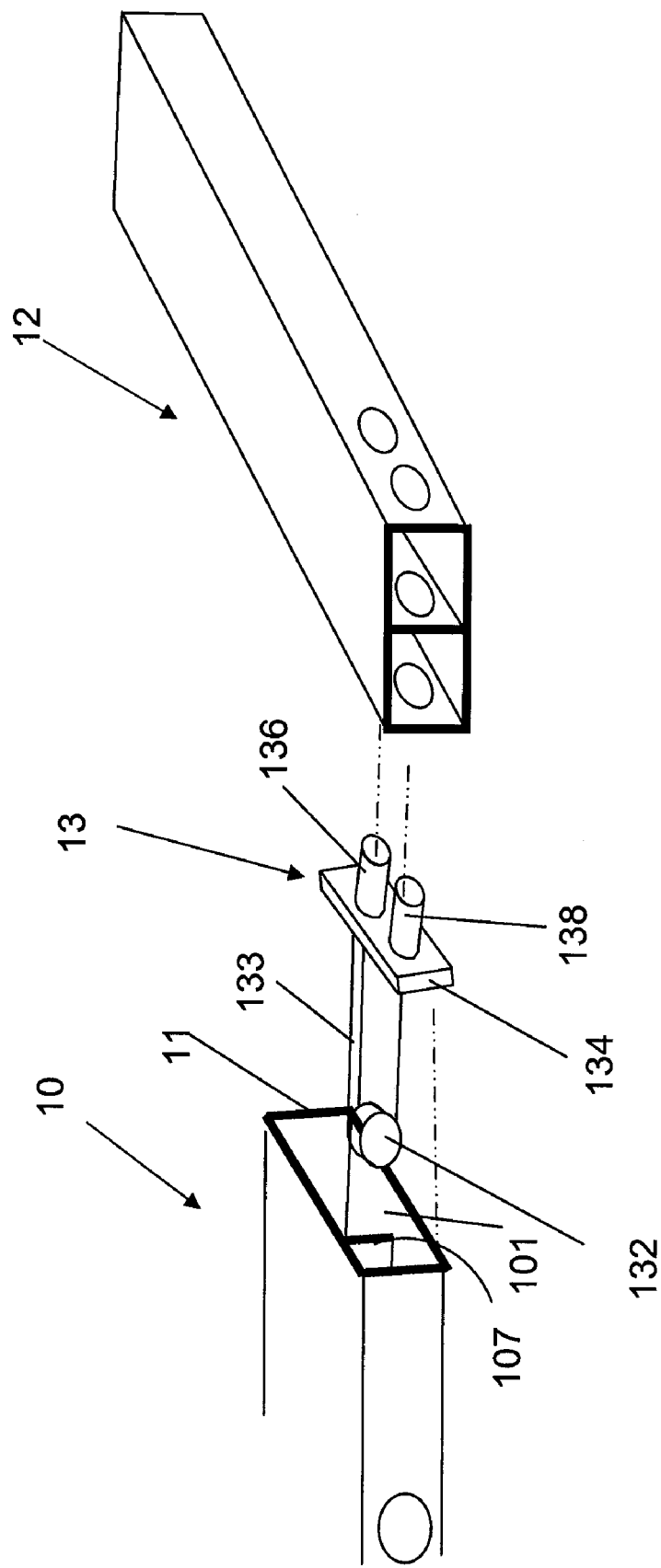
FIG. 1 is an exploded view of a structure for joining two hollow lineal members having rectangular cross sectional profiles.

In the embodiment portrayed in FIGS. 1-4, a first hollow lineal structural member 10 is joined perpendicularly to second hollow lineal member 12, in a mortise and tenon manner, by coupling insert 13. As used herein, the term lineal member will refer to an elongated member having a substantially constant cross section over its length. Lineal members may be stock materials of indefinite length, from which members of a predetermined length can be cut, or may be members of a defined length. Also, as used herein, "hollow" means that at least some portion of the lineal member comprises an inner space or cavity. The ends of lineal members may be cut at any suitable angle to the longitudinal direction, in a smooth single cut fashion, or may be cut in a manner defining a variety of shaped end cuts, or end fabrications, that may be needed, for example, to fit an end portion of a first lineal member to a side portion of a second lineal member having a particular, perhaps complex, cross sectional profile. In the embodiment portrayed in FIG. 1, the cross sectional profile of lineal member 12 is a simple rectangle, and member 10 is to be joined perpendicularly to member 12, so that end portion 11 of lineal 10 can be formed in a simple, single cut, manner, in a plane oriented at 90° to the longitudinal direction of member 10.

Figure 2:
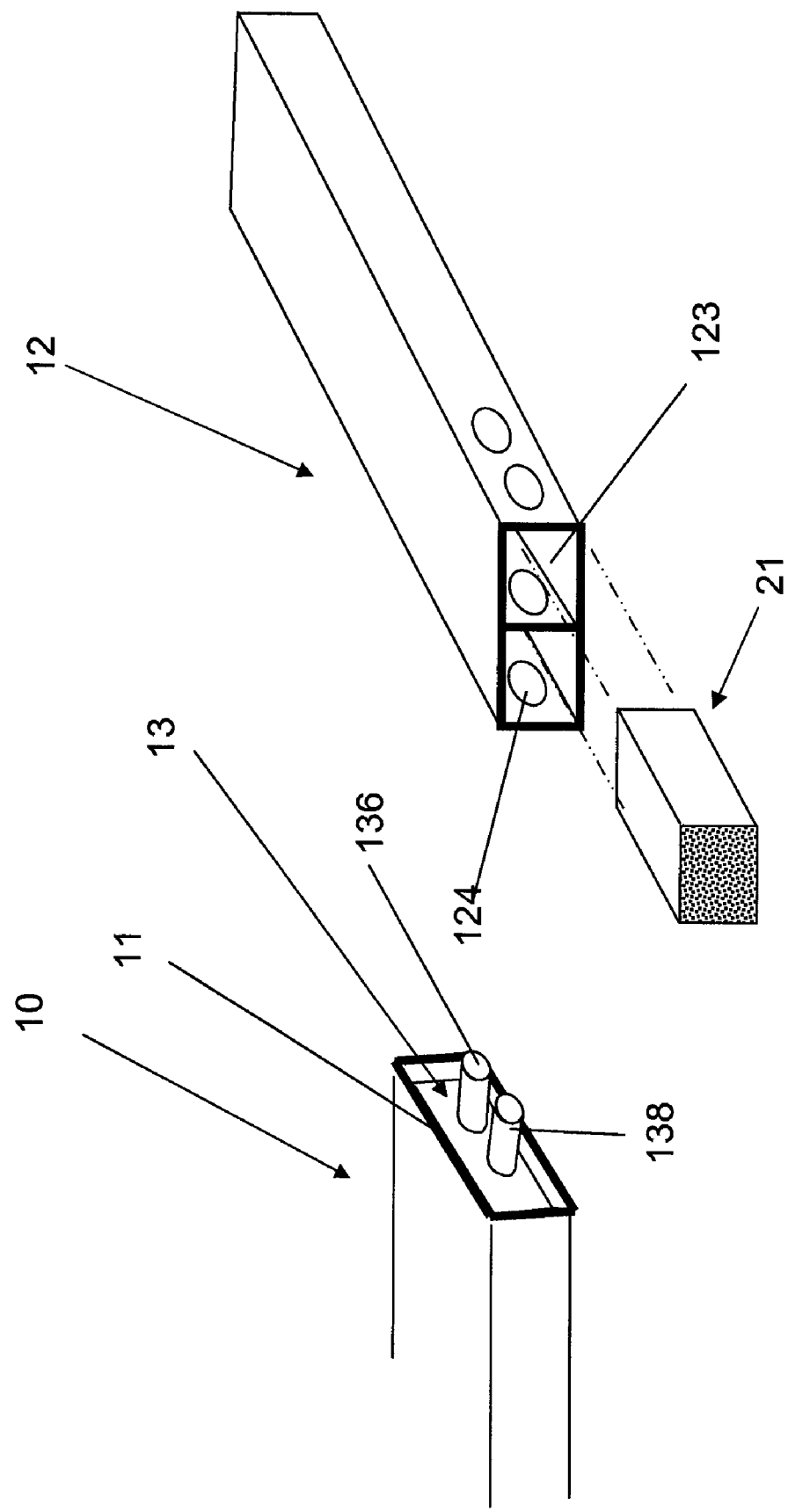
FIG. 2 is a partially assembled exploded view of the structure portrayed in FIG. 1.
Figure 3:
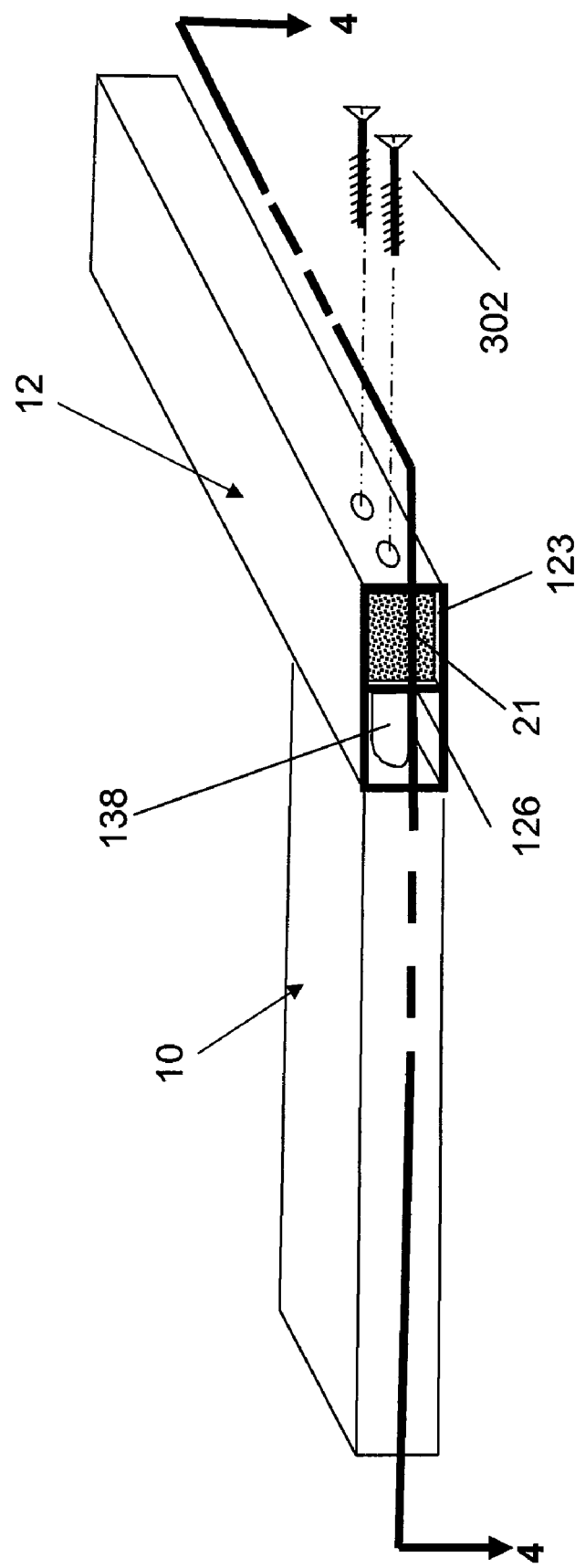
FIG. 3 portrays the structure shown in FIG. 1 after assembly but prior to installation of screws.
Figure 4:
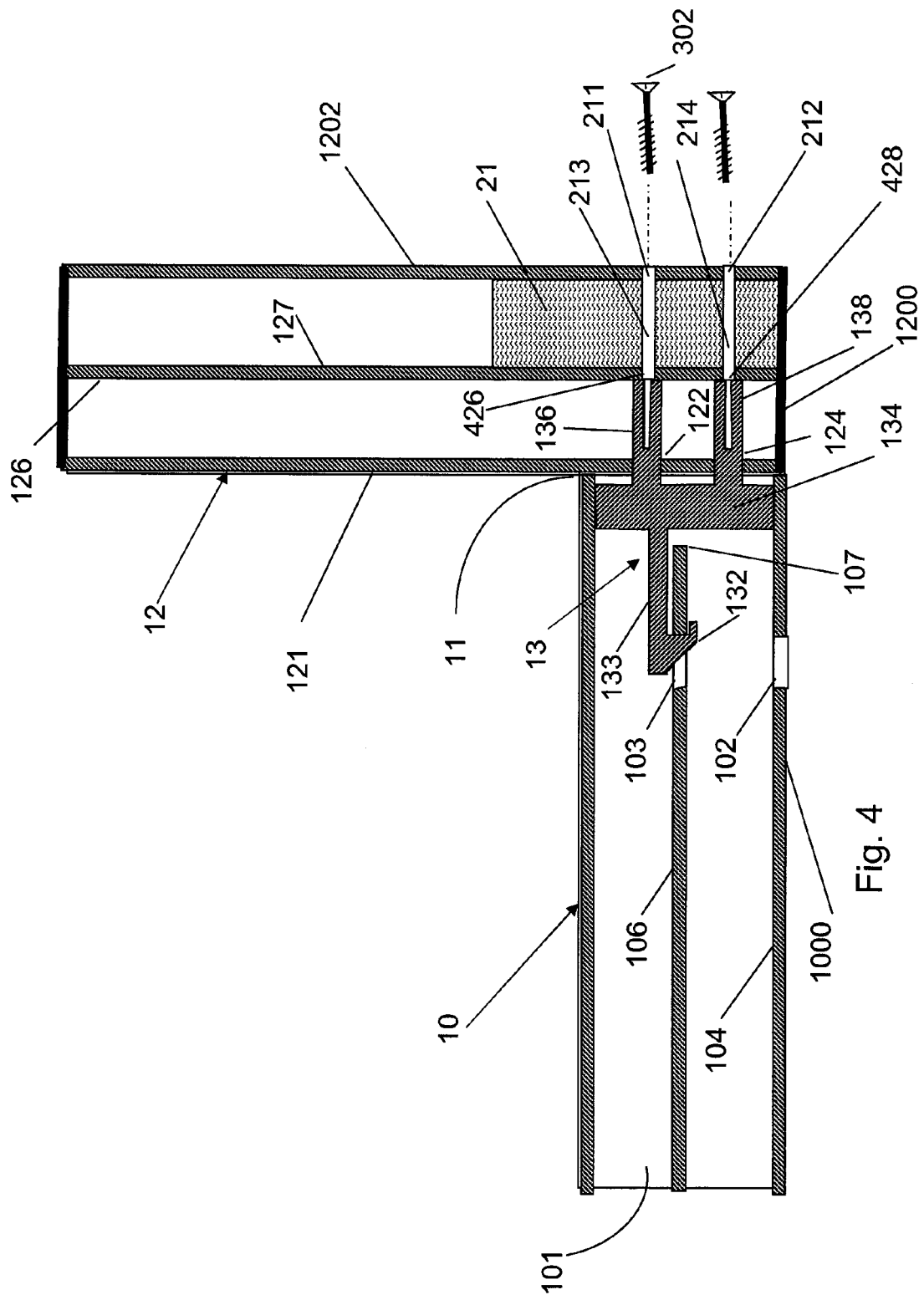
FIG. 4 is a sectional view of the structure shown in FIG. 3.

Referring to FIG. 2, a first member 10 is joined to second member 12 by first installing insert 13 in end portion 11 of member 10. Referring to FIGS. 3 and 4, first member 10 is then assembled with second member 12 by inserting tenon portions 136 and 138 of insert 13 into transverse openings 122 and 124 provided in member 12. Additionally, a solid core member, or core block, 21, is inserted into cavity 123 of member 12. Referring to FIG. 4, insert 13 is held in place by hook portion 132, which is fixedly attached to hook arm 133, which is in turn fixedly attached to base plate 134. Hook arm 133 is adapted to resiliently hold hook portion 132 in a position that enables it to snap into web opening 103 upon insertion of insert 13 to a suitable depth, so as to hold insert 13 in place under tensile loads tending to pull it out from member 10. Insert 13 is held in alignment relative to lineal member 10 by base plate 134, which is adapted to match at least a portion of the profile of internal surface 101 of lineal member 10. Tenon portions 136 and 138 are fixedly attached to base plate 134 so as to extend from end 11 of member 10. It will further be noted that internal web 106 has been cut back to surface 107 to allow space for insert 13 to be installed.

Opening 103 can be produced by a drill that first drills access hole 102, and then drills through web 106 to produce opening 103. While it is not required that opening 103 be circular in shape, the circular shape is convenient, in that it can be produced by a simple drilling operation. The circular shape has the further advantage that it avoids sharp corners that could produce stress concentrations that might cause breakage of web 106. It will be recognized that alternative methods of producing opening 103 may be used. For example, a right angle punch or other suitable cutting device, of one of the various types known to those skilled in the art, could be inserted through end 11 to punch out or otherwise produce aperture 103. Producing aperture 103 using a tool that could be inserted through end 11 of member 10 would have the advantage of eliminating the need for hole 102.

Second member 12 is adapted to receive tenon members 136 and 138 through transverse openings 122 and 124, respectively. Member 12 is further adapted to receive screws 302 through clearance holes 211 and 212 in edge web 1202 and clearance holes 213 and 214 in core block 21, and through clearance holes 426 and 428 of internal web 126. Screws 302 are thus able to self-thread into tenon portions 136 and 138, respectively. It will be recognized that while screws 302 are portrayed as self threading in this embodiment, alternative embodiments in which tenon portions 136 and 138 contain pre-threaded holes are also contemplated. It will be further recognized that while screws 302 are portrayed in the various drawings contained herein as flathead screws, other types of screws may also be useful in certain applications. For example, holes 211, 212, 213, and 214 may be counterbored and round or hex headed screws used. Counterboring also provides the opportunity for covering the heads of screws 302 with plugs, sealant, or other covering materials. It will also be recognized, however, that when the heads of screws 302 seat against outer web 1202 rather than against core block 21, the load imposed by screws 302 is shared between web 1202 and core block 21.

It will also be recognized that tenon portions 136 and 138 need not be circular in cross section. Tenon portions could be rectangular in cross section, or could be of a variety of other cross sectional shapes. The space between tenon portions 136 and 138 could be filled with a connecting web, so as to produce a single tenon portion. Circular cross sections, on the other hand, provide the advantage that openings for receiving the tenon portions can also be circular, thereby reducing the likelihood of breakage due to stress concentrations and allowing convenient production by simple drilling operations.

Insert 13 can be conveniently produced by injection molding of a thermoplastic polymeric material. The polymers suitable for insert 13 are not particularly limited, though materials that are capable of forming strong couplings with self threading screws are often preferred. Fillers and other additives may be used in the resin formulation, as would be apparent to one of ordinary skill in the art. A particularly useful property of materials for insert 13 is the ability to provide good adhesion to commonly used adhesives and sealants. Since insert 13 is typically not visible in the finished product, appearance of the part may be of less importance, compared to the importance of mechanical strength or robustness under extreme environmental conditions such as extreme ranges of temperatures. A particularly useful polymeric material for insert 13 is glass filled polyamide.

Other materials and manufacturing methods for insert 13 are also contemplated. For example, metal inserts could be incorporated into a molded part, to achieve greater mechanical strength or improved thread holding. In another embodiment, insert 13 could be made from a thermosetting, rather than a thermoplastic material. In yet another embodiment, die cast metal could be used in place of injection molded polymeric materials. Inserts assembled from more than one piece are also contemplated. In still another embodiment, the insert could be made of one or more pieces of sheet metal by, for example, stamping, bending, and possibly welding.

It is typically preferred that end surface 1200 of member 12 match side surface 1000 of member 10, to form a smooth continuous surface. The matching of surfaces 1000 and 1200 can be controlled by the location and sizing of openings 122 and 124 in member 12. Openings 122 and 124 can, for example, be precisely located and sized to provide a relatively snug fit so as to assure alignment of surface 1000 and end 1200.

Core block 21 serves to support outer web 1202 and to distribute the load of screws 302 over a wider area of web 126, thereby reducing the likelihood of failure due to breakage of web 126, and allowing it to be made thinner, in some instances. Core block 21 also serves to receive fasteners such as screws for attaching hinges and other fittings. Materials suitable for core block 21 are not particularly limited, though preferred materials are those of moderate elastic modulus, so as to enable them to conform sufficiently to surface 127 of web 126 to distribute effectively load stresses over the surface 127 of web 126. It is further preferred that core block 21 be formable and drillable by conventional methods. It has been found that a particularly useful and cost effective material for core block 21 is wood. While core block 21 is portrayed in FIG. 4 as a relatively short member, it will be recognized that it could extend for a greater distance, and may serve the additional function of stiffening member 12. It will also be recognized that while core block 21 is shown as being rectangular in shape, other suitable shapes may also be useful. For example, portions of the cross section of core block 21 may be removed to limit contact with the interior surface of member 12 to only selected areas, for example, those areas that might be best able to withstand stress without excessive deformation or breakage. It may also be useful to remove certain portions of the cross section of core block 21 to ease its insertion into member 12.

Figure 5:
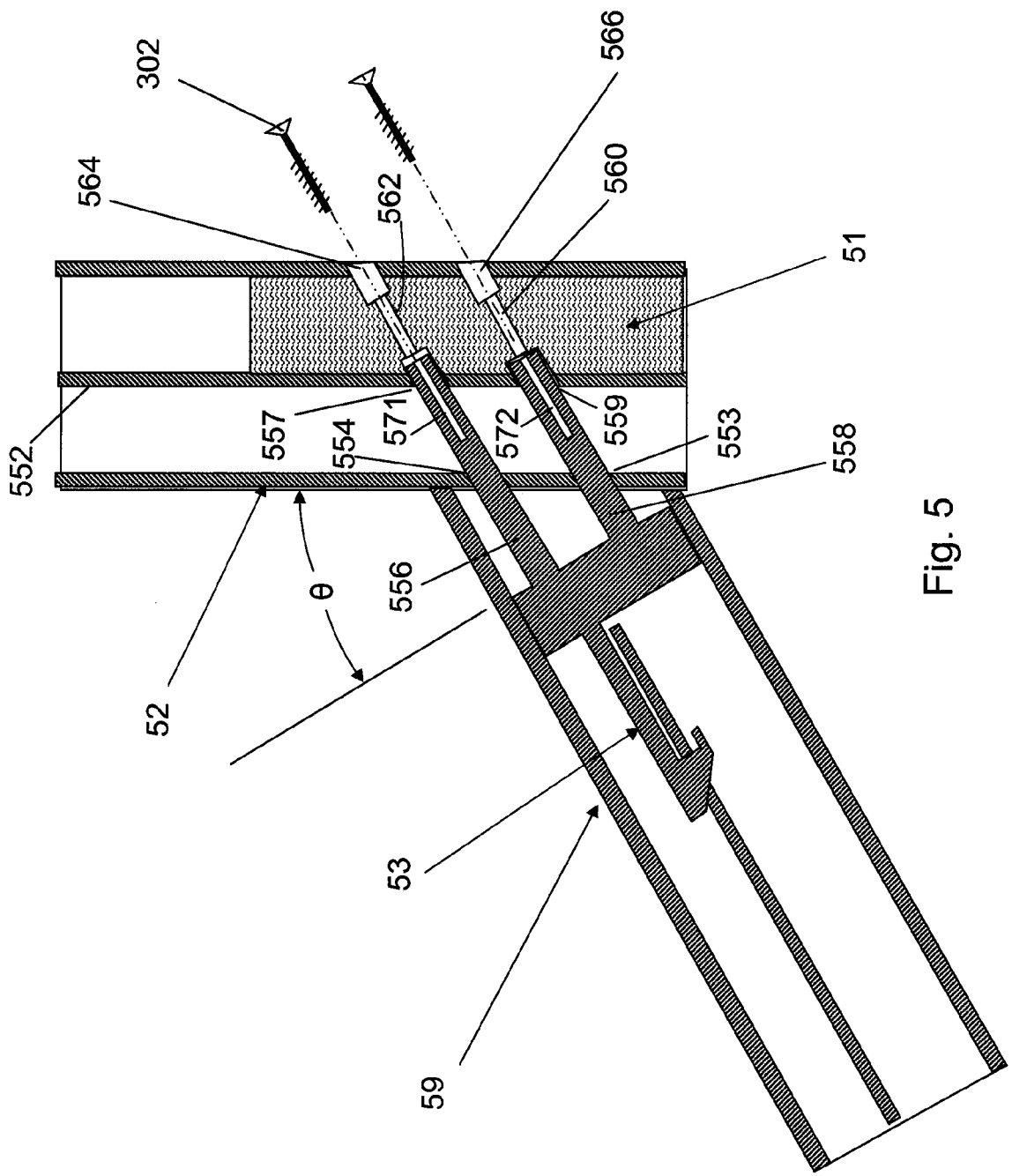
FIG. 5 is a sectional view of a structure for joining two hollow lineal members at an angle other than 90°.

Referring to FIG. 5, lineal members can be joined at angles other than 90°. First lineal member 59 is cut at angle θ to produce the joint portrayed. Openings 553, 554, 557, and 559 are provided to receive tenon portions 556 and 558. It will be appreciated that while tenon portions 556 and 558 are portrayed as being of different lengths, there may be situations in which they could be of the same length, with the depths of openings 557 and 559 being adjusted to properly accommodate them. Clearance holes 560 and 562 are drilled concentric with holes 571 and 572 of tenon portions 556 and 558, and counterbores 564 and 566 are drilled concentric to holes 560 and 562. The holes can be located using appropriate locating fixtures or other locating devices, as would be apparent to one skilled in the art. Holes 571 and 572 in tenon portions 556 and 558 are sized to allow threading of screws 302 into them, while holes 560 and 562 are sized to provide clearance for screws 302, and counterbores 564 and 566 are sized to allow clearance for the heads of screws 302. While counterbores 564 and 566 are shown as being relatively deep, it is contemplated that they need not be of the depth shown, and could instead be only deep enough to provide adequate seating of the heads of screws 302.

Figure 6:
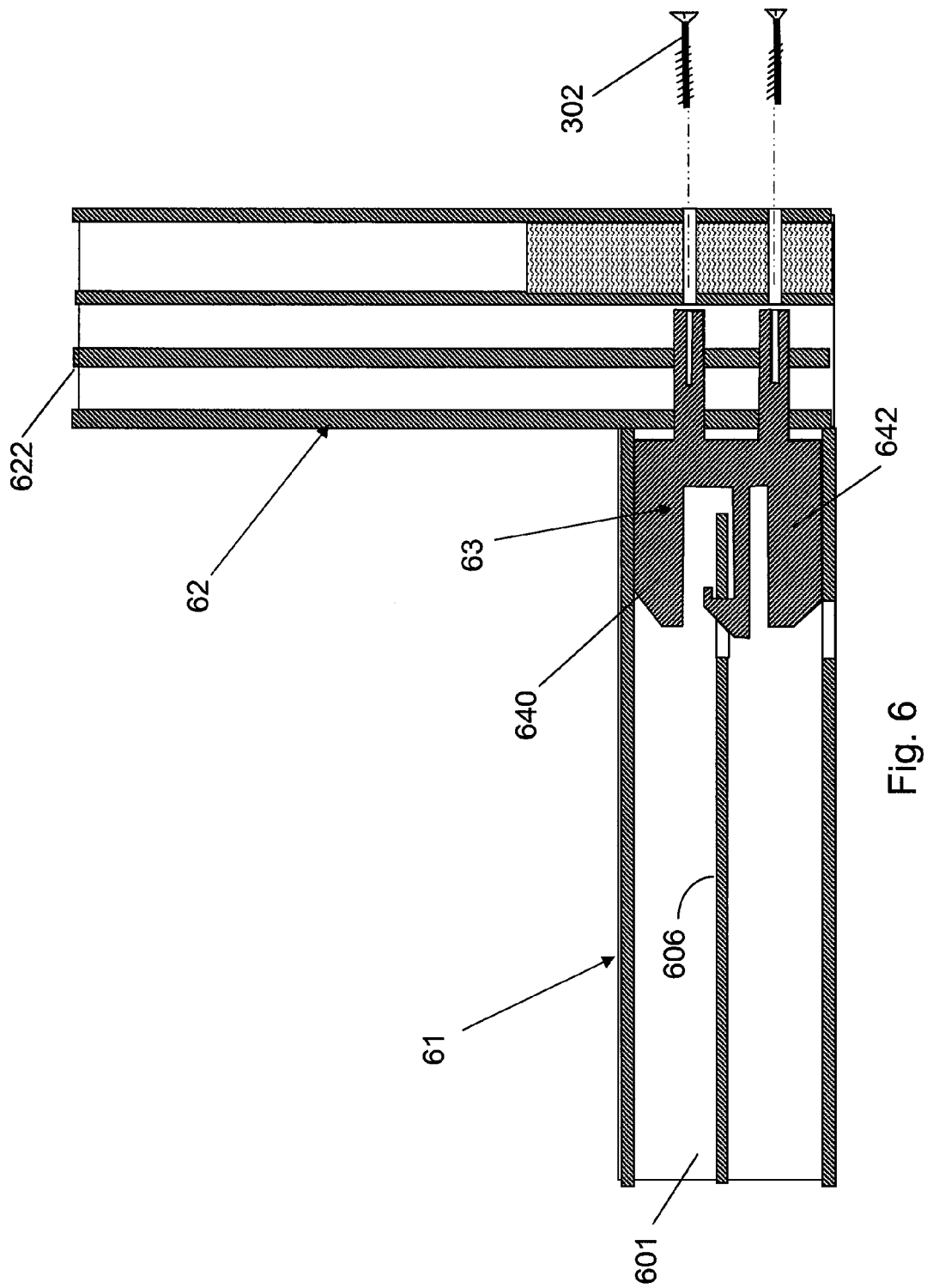
FIG. 6 is sectional view of a structure for joining two hollow members using a coupling insert having solid alignment arms to enhance alignment of the insert relative to a lineal member.

In a third embodiment, portrayed in FIG. 6, alignment of insert 63 relative to first lineal member 61 is enhanced by solid alignment arms 640 and 642, which engage internal surface 601 of member 61. Additionally, alignment and positioning of lineal member 62 relative to member 61, both during and after assembly, can be enhanced by additional internal web 622. It will be recognized that while added web 622 and alignment arms 640 and 642 are shown together in FIG. 6, they are separate features that need not be used together in the same joint.

Figure 7:
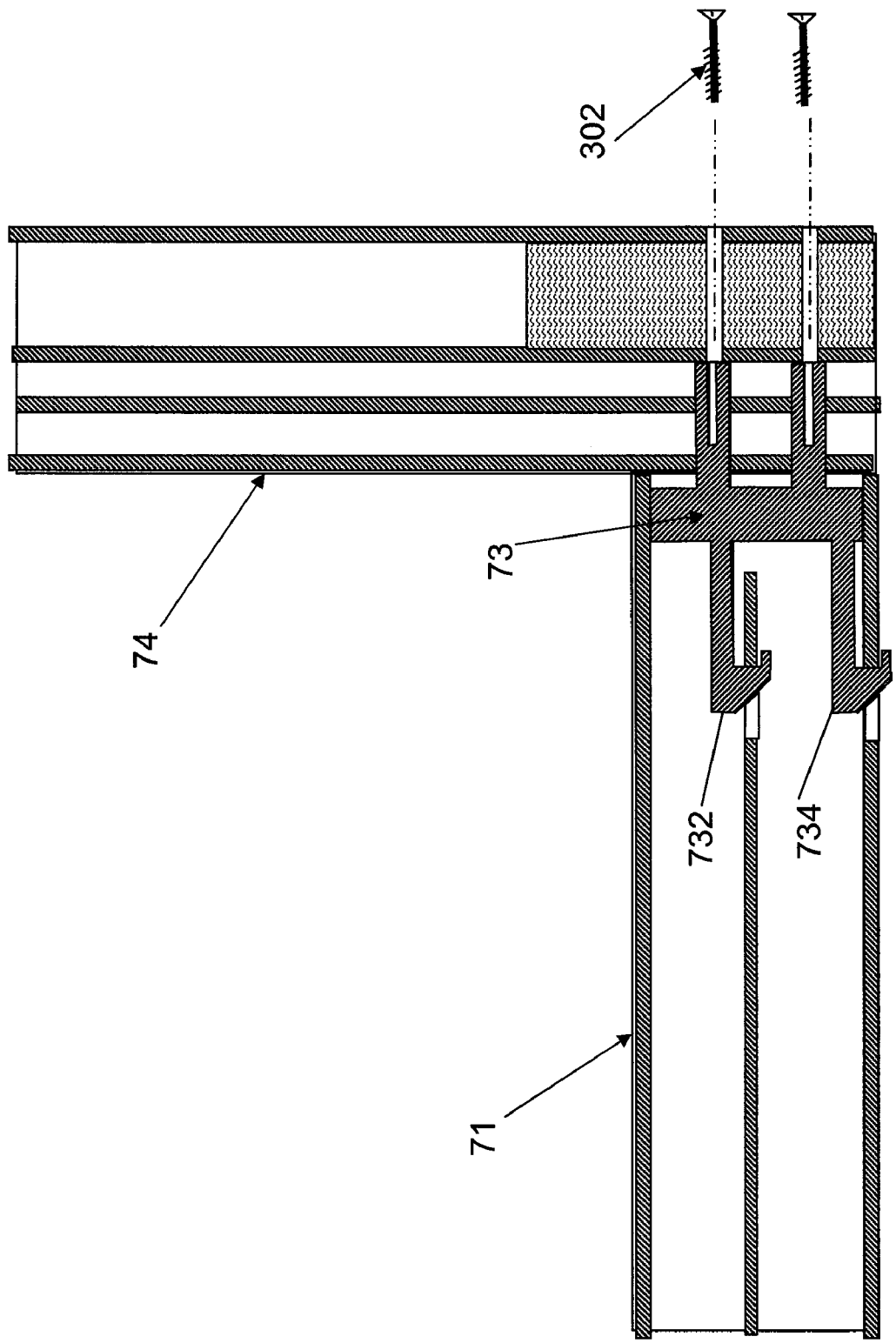
FIG. 7 is a sectional view of a structure for joining two hollow lineal members using a coupling insert having two hook portions.

In yet another embodiment, portrayed in FIG. 7, the strength of the joint between lineal members 71 and 74 is enhanced by dual hook portions 732 and 734 of insert 73, which distribute the tensile load over two webs, rather than one, as in previous embodiments. This embodiment has the disadvantage, in some applications, of having hook 734 exposed to the exterior of member 71.

Figure 8:
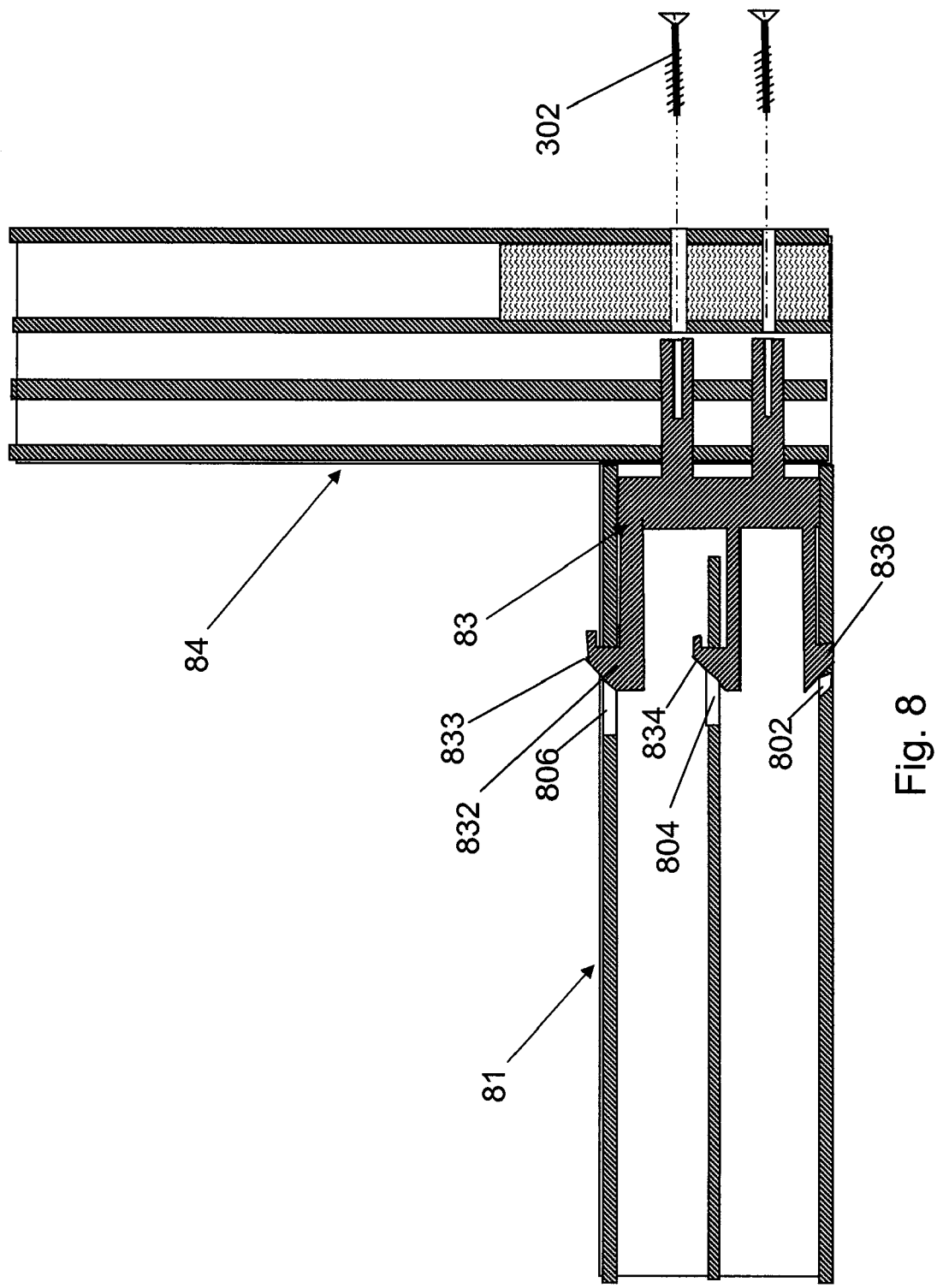
FIG. 8 is a sectional view of a structure for joining two hollow lineal members using a coupling insert having two hook portions and a detent portion.

The external surface of the joint can be made smoother by the embodiment shown in FIG. 8, wherein detent portion 836 partially, or in some embodiments, completely, fills opening 802, while providing a relatively smooth surface and, in addition, sharing the tensile load with hook portions 832 and 834. On the other hand, protrusion of hook portion 832 may, in some instances, serve a useful purpose. For example, if members 81 and 84 are part of a frame surrounding a glazing unit or other panel, protruding portion 833 may serve as a spacer, or setting block, to aid in centering the glazing unit in the opening formed in part by frame members 81 and 84.

Figure 9:
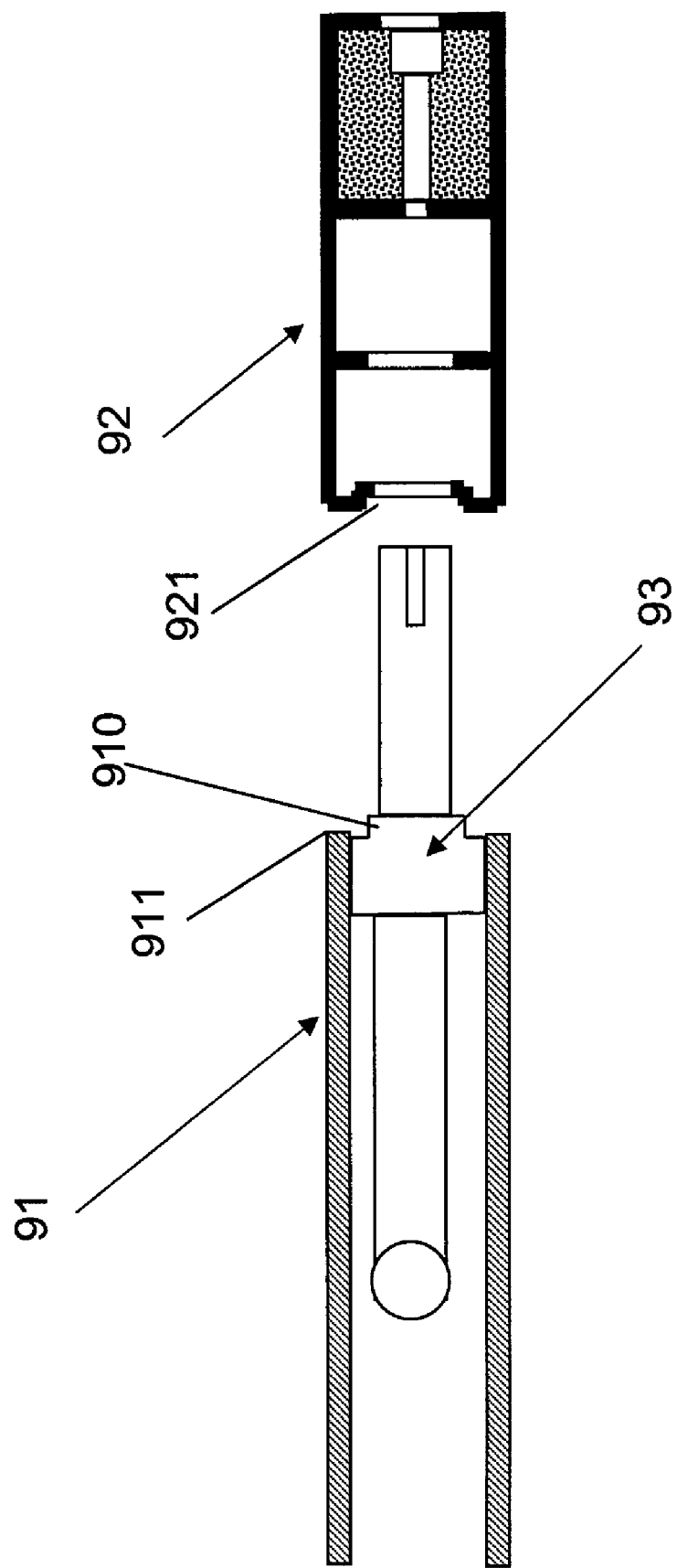
FIG. 9 is a sectional view, prior to assembly, of a structure for joining a first hollow lineal member to a second hollow lineal member using a coupling insert attached to the first member, wherein the coupling insert has an extended portion that engages a channel portion in the second member.
Figure 10:
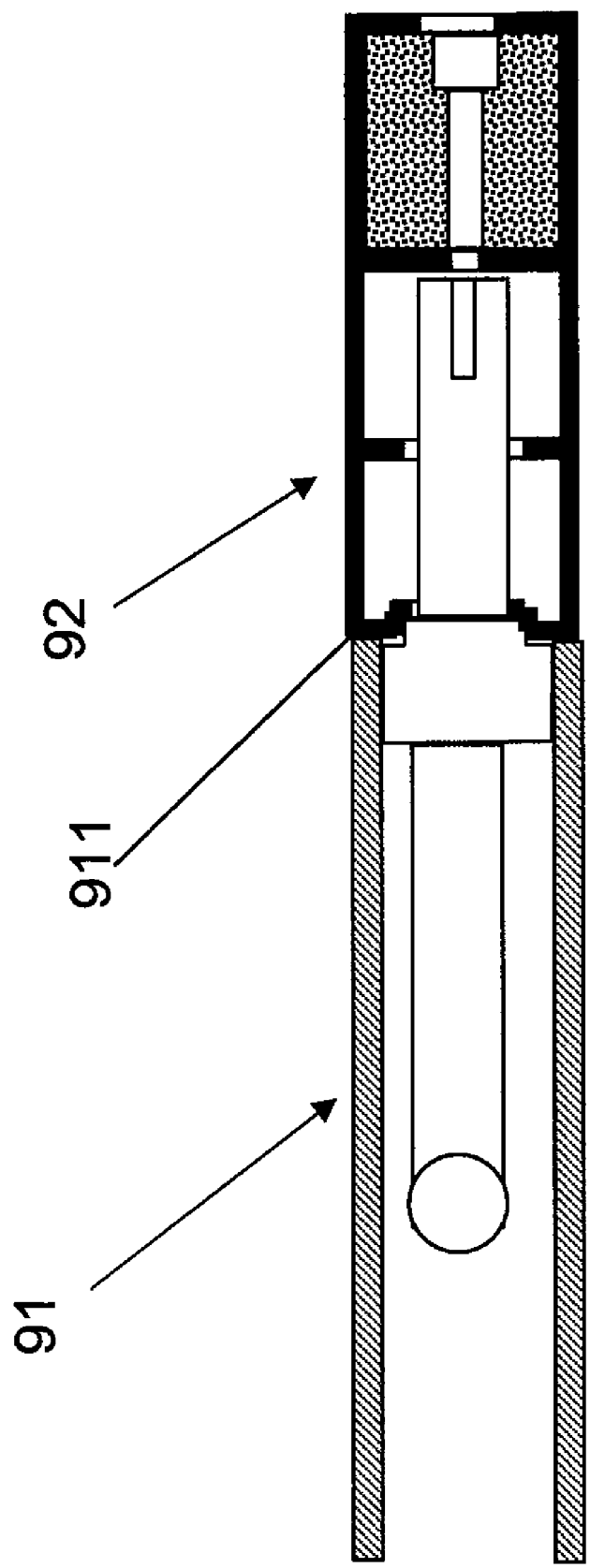
FIG. 10 is a sectional view of the structure shown in FIG. 9 after assembly, but prior to installation of screw(s).

In yet another embodiment, the inserts of the present invention can align the members to be joined in an alternative manner. Referring to FIGS. 9 and 10, lineal member 92, shown in an end view, is provided with channel 921, which receives extended portion 910 of insert 93, thereby keying members 91 and 92 together in an aligned manner, while still allowing end portion 911 to be a simple flat end. When this configuration is used, it may not be necessary to use the dual tenon system of previous embodiments, since the alignment provided by the two tenons is now provided by the fitting of extended portion 910 into channel 921. In yet another embodiment, end portion 911 could itself be fabricated to a profile that would fit directly into channel 921, thereby making extended portion 910 optional.

Figure 11:
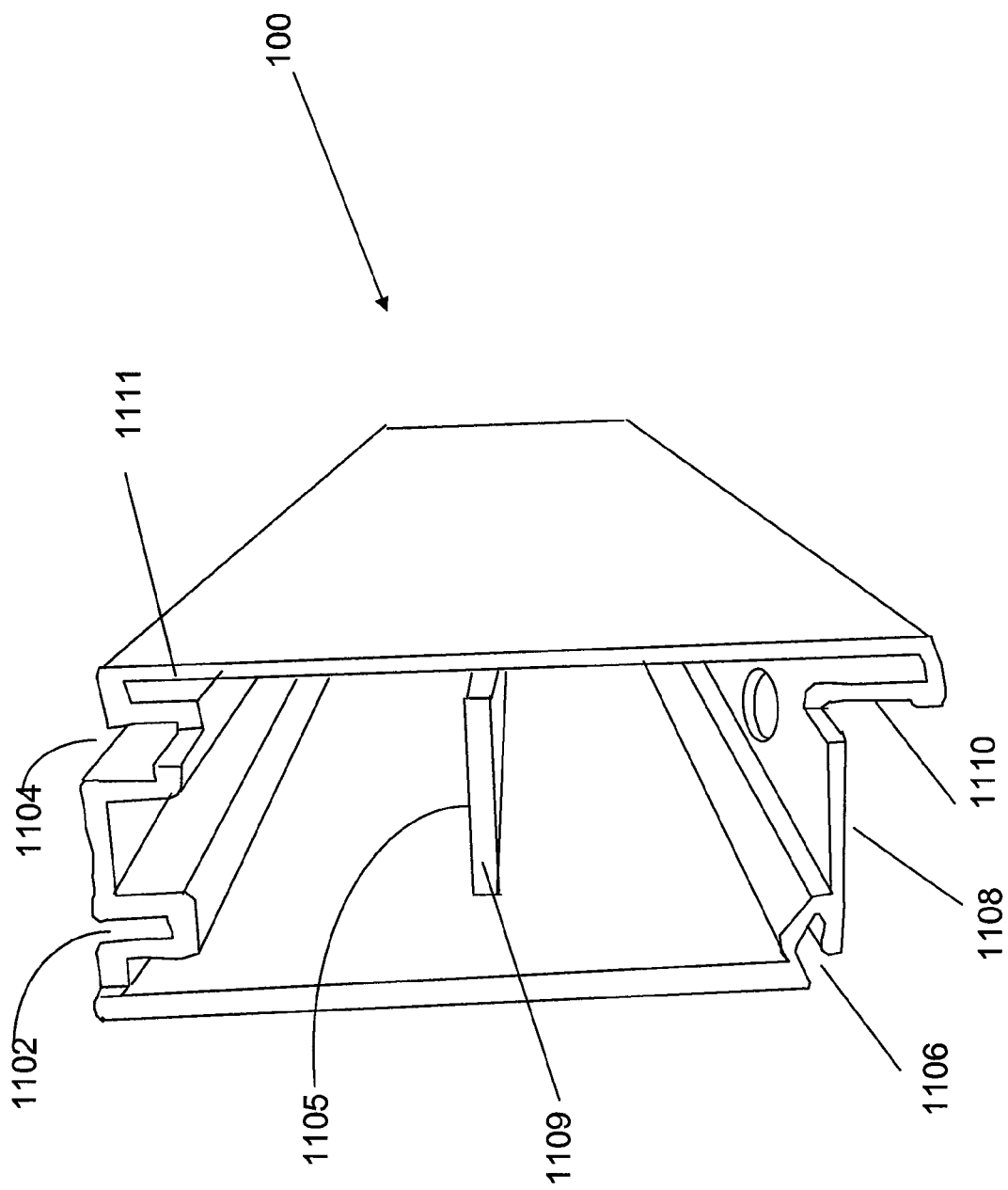
FIG. 11 portrays a cross sectional profile of a lineal member suitable for use as a top rail or a bottom rail of a door panel frame.

A significant advantage of hollow lineal members produced by extrusion or pultrusion is that they can be economically made in the complex profiles useful in fenestration, wherein a single profile can contain many features that enable it to serve a range of functions. For example, referring to FIG. 11, the cross sectional profile of lineal member 100, which can be used as a top or bottom rail of a door panel frame, includes grooves 1102 and 1104 for receiving weather stripping, when used as a top rail of a door panel. Member 100 can also be used as a bottom rail of a door panel, in which case grooves 1102 and 1104 can receive a bottom sweep. Groove 1106 can be provided for receiving a glazing bead, and edge wall 1108 and bedding surface 1110 can be provided for receiving a glazing unit. End portion 1111 has been fabricated to mate with a side portion of a stile of a door panel frame. In addition, internal web 1105 has been cut back to surface 1109 to provide room for a coupling insert.

Figure 12:
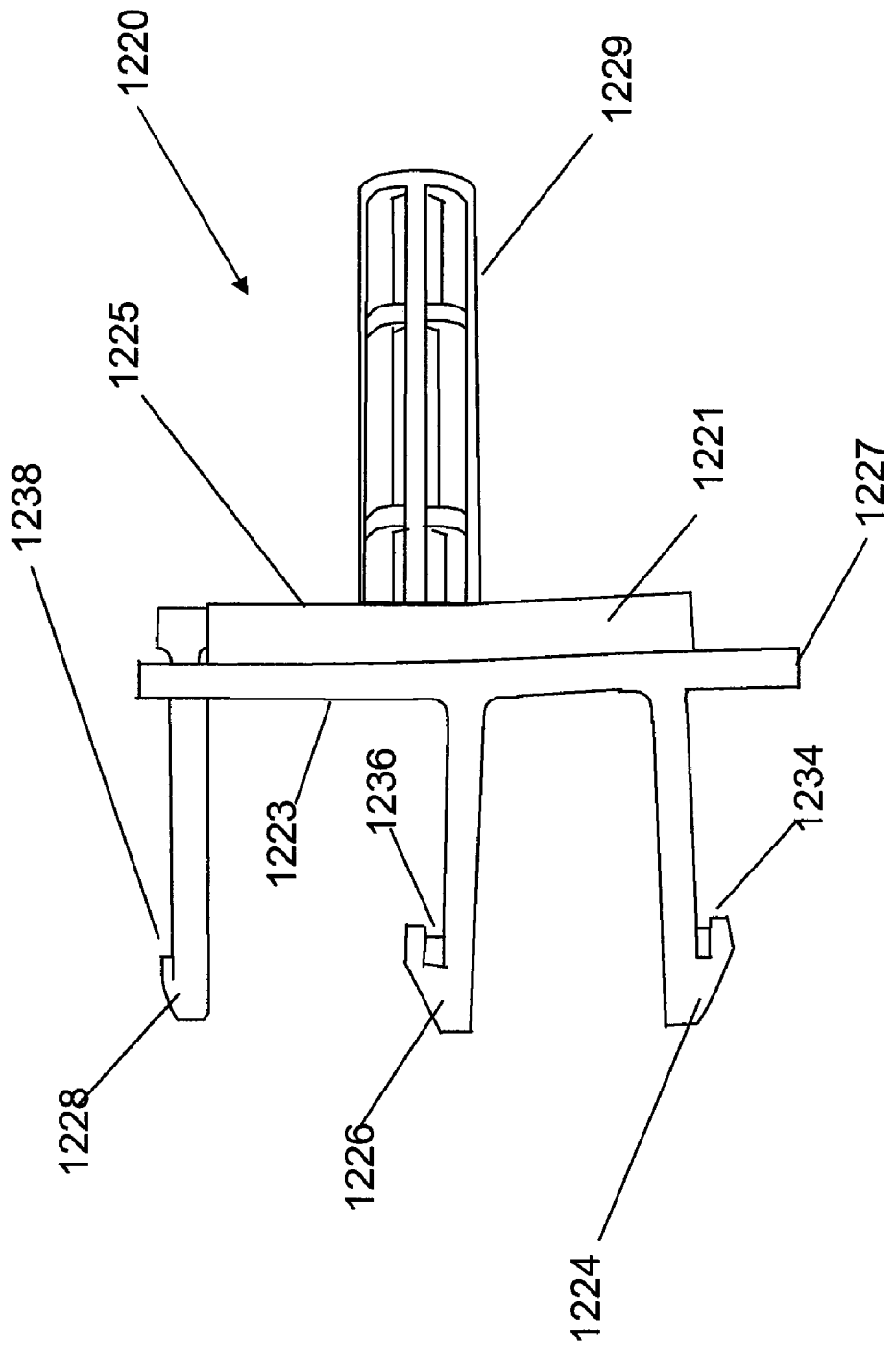
FIG. 12 portrays a coupling insert suitable for use with the lineal member portrayed in FIG. 11.
Figure 13:
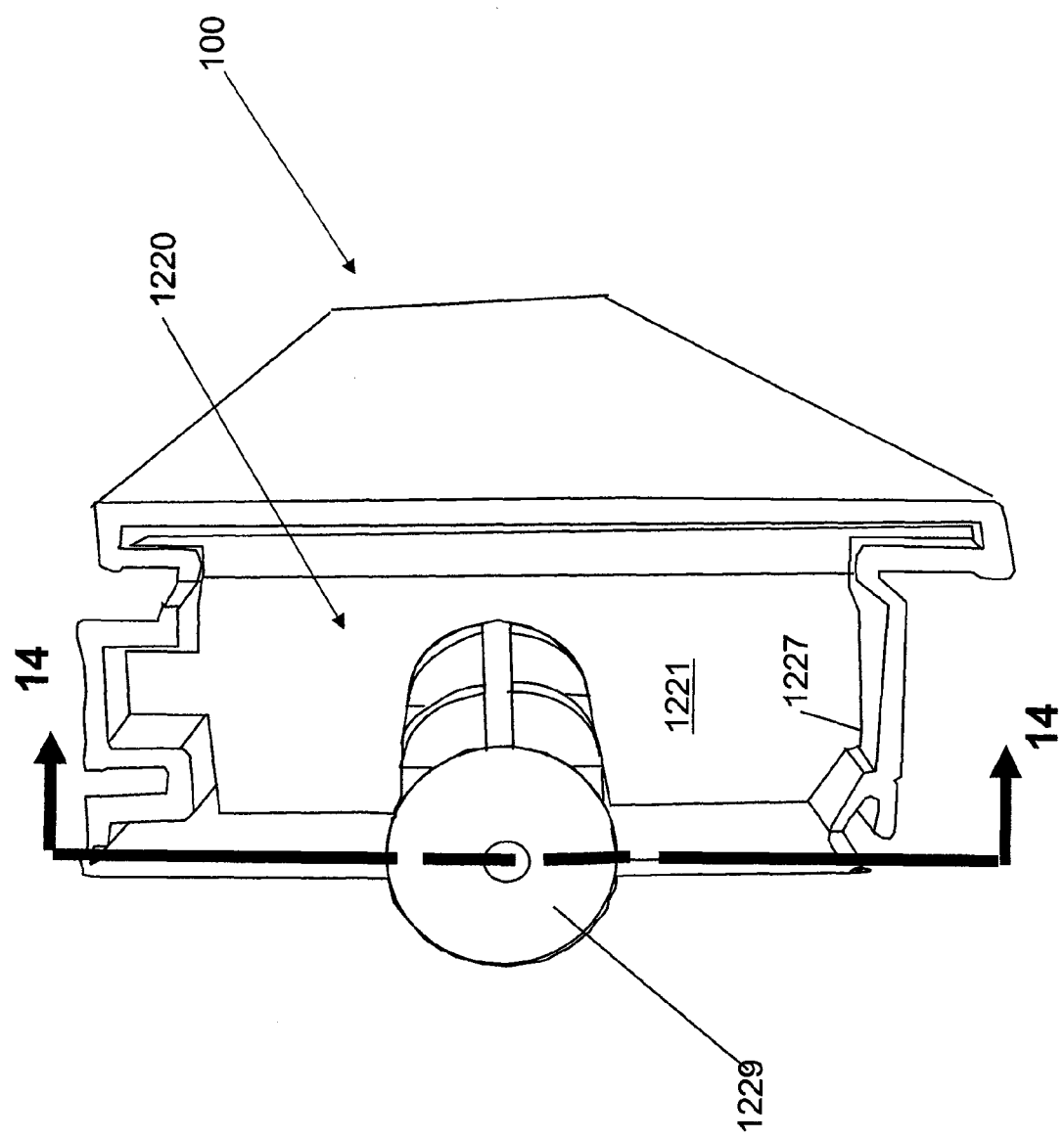
FIG. 13 portrays the coupling insert shown in FIG. 12 after installation in the lineal member shown in FIG. 11.

Referring to FIG. 12, an insert, 1220, for joining first member 100 to a suitably adapted second hollow structural member is portrayed. Insert 1220 comprises base plate 1221, which has first side 1223 and second side 1225. First hook portion 1224, second hook portion 1226, and detent portion 1228 extend from first side 1223 of base plate 1221. Tenon portion 1229 extends from second side 1225 of base plate 1221. Referring to FIG. 13, the external periphery 1227 of base plate 1221 is adapted to be received by the internal profile of lineal member 100.

Figure 14:
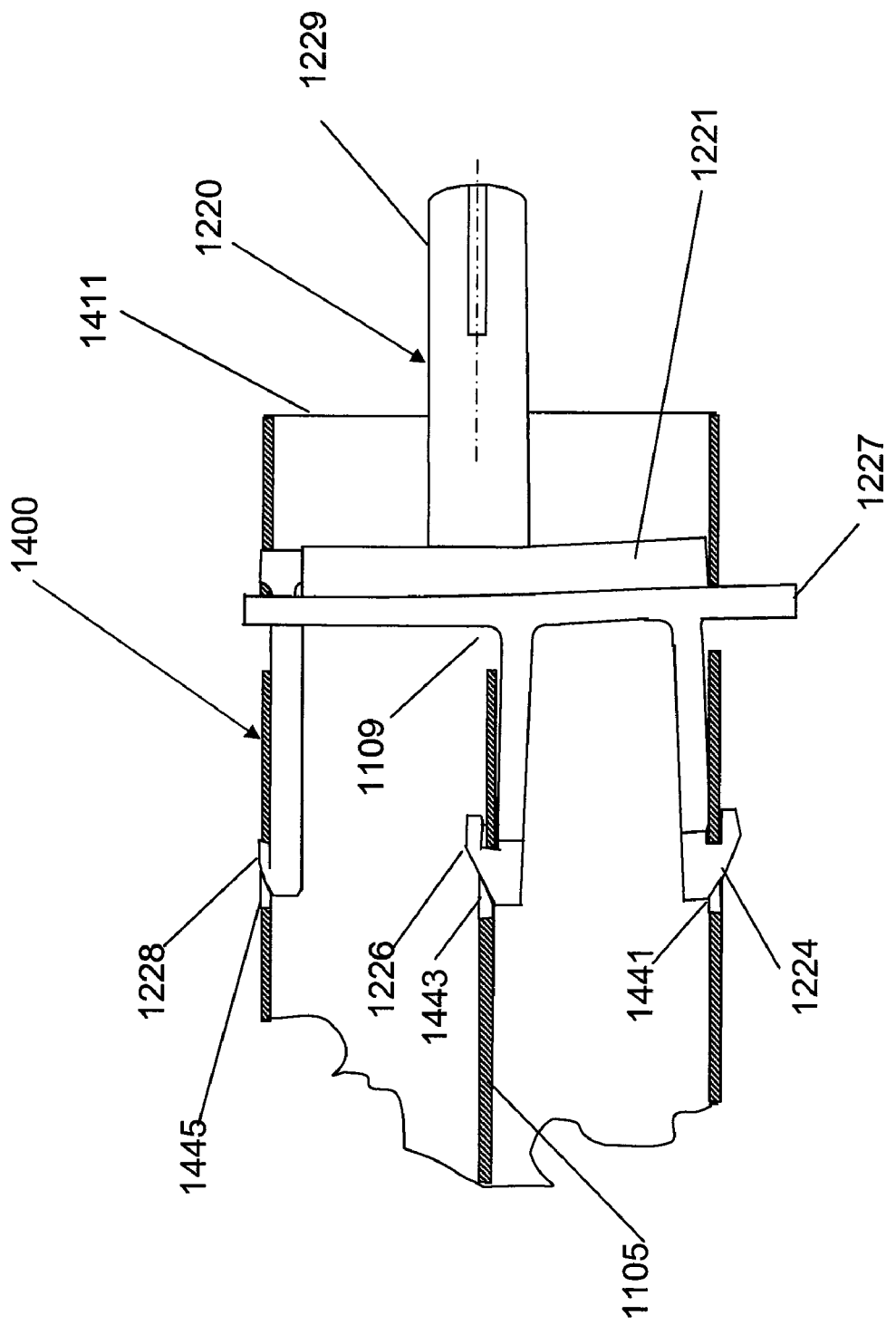
FIG. 14 is a sectional view of the coupling insert and lineal member shown in FIG. 13.

Referring to FIG. 14, first member 1400 is further adapted to receive insert 1220 by openings 1441, 1443, and 1445, which can be produced by drilling transversely through lineal 100, at locations suitable for producing a predetermined protrusion of tenon portion 1229 from end portion 1411 of member 1400. The diameters of apertures 1441, 1443, and 1445 should be sufficient to allow them to receive hook portions 1224 and 1226, and detent portion 1228 of insert 1220, but not so large as to harm the overall integrity of first member 100. It is further useful for the radii of surfaces 1224, 1226, and 1228 of insert 1220, which engage openings 1441, 1443, and 1445, respectively, to match the radii of those openings, at least in the area of contact, so as to maximize the contact area between the hook portions and the apertures and minimize local stresses. It will also be noted that internal web 1105 has been cut back to surface 1109 to allow space for base plate 1221. A second insert 1220', not shown, may be installed in the second end of first member 100. Installation of inserts 1220 and 1220' may be performed by grasping tenon portion 1229, orienting the insert so as to match the peripheral profile of base plate 1221 with the interior profile of first member 100, and sliding it in until the hooks and detent snap into place.

Figure 15:
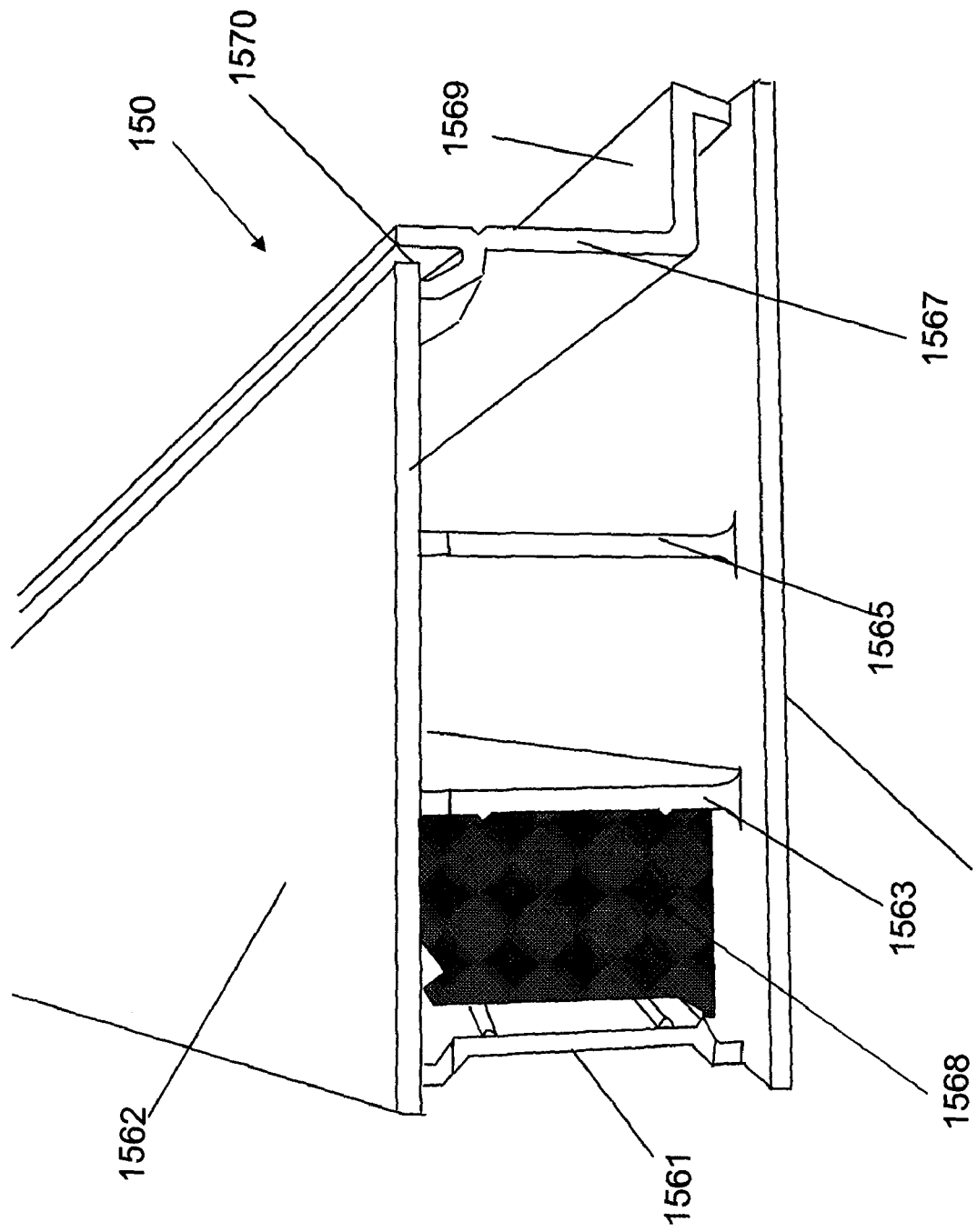
FIG. 15 portrays a cross sectional profile of a lineal member suitable for coupling to the lineal member portrayed in FIGS. 11 and 13.

Referring to FIG. 15, an embodiment of a second lineal member 150, to which first lineal member 100 can be joined, is portrayed. Second member 150 comprises a first, or interior facing wall 1562 and a second, parallel, facing wall 1564, joined by first edge web 1561 and second edge web 1567, along with first internal web 1563 and second internal web 1565. Core block 1568 is provided between edge web 1561 and first internal web 1563. In one embodiment, core block 1568 is a solid member that extends for some length along lineal 150. As discussed hereinabove, core block 1568 can conveniently be made of wood.

Figure 16:
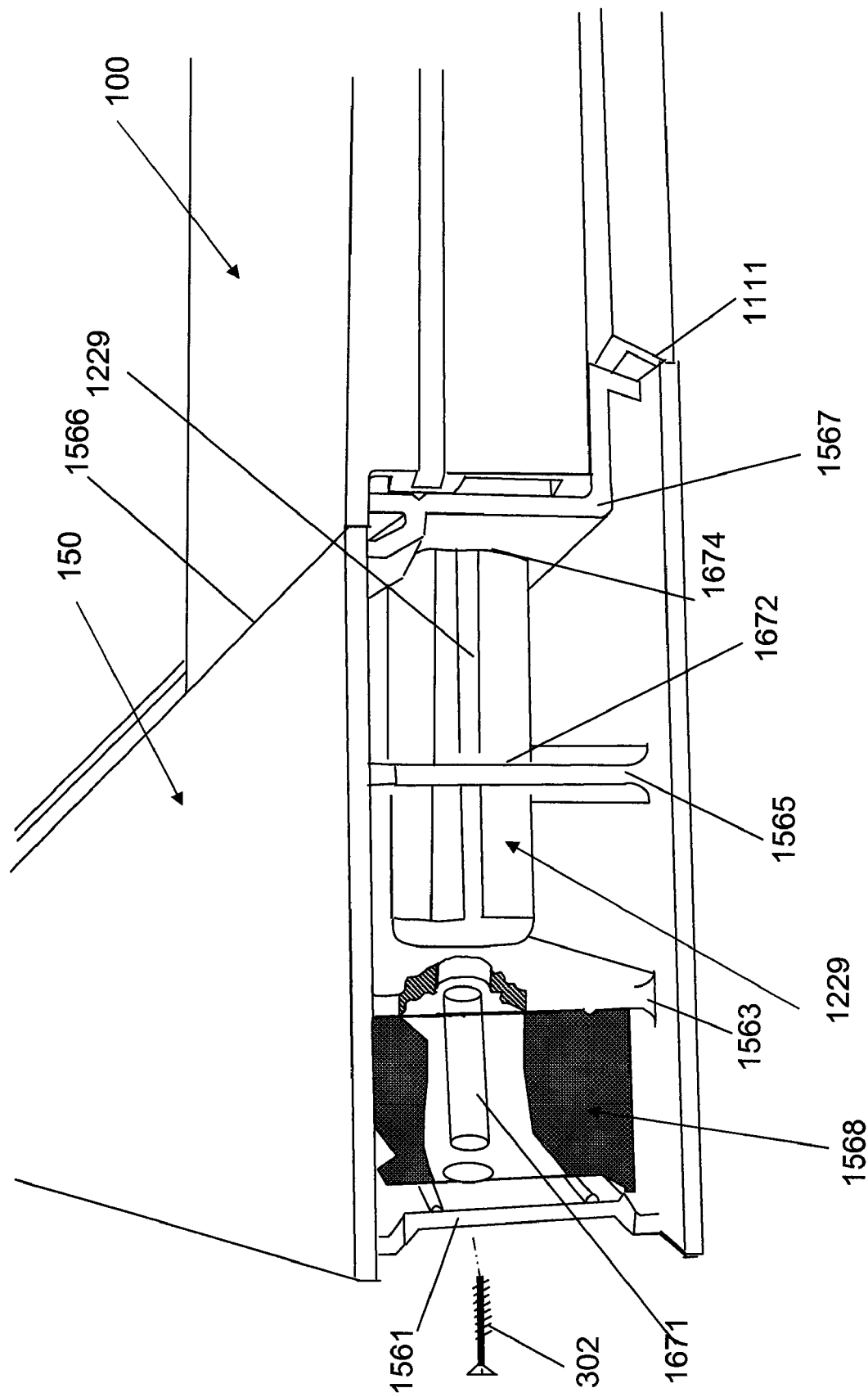
FIG. 16 portrays an assembled structure for coupling the lineal member portrayed in FIG. 11 to the lineal member portrayed in FIG. 15, using the coupling insert portrayed in FIG. 12.

Referring to FIG. 16, screw clearance hole 1671 is drilled through web 1561, core block 1568, and web 1563. Openings 1672 and 1674 are provided in webs 1565 and 1567, respectively, for the purpose of receiving tenon portion 1229. Joining of first member 100, in which insert 1220 has been installed, to second member 150, is performed by first inserting tenon portion 1229 through openings 1672 and 1674, thereby bringing end portion 1111 of first member 100 into engagement with web 1567 of second member 150. Screw 302 is then installed through clearance hole 1671, into a threadable pilot hole in tenon portion 1229. Tightening of screw 302 couples tenon portion 1229 to first member 100, thereby pulling first member 100 tightly against second member 150 to form the completed joint.

Figure 17:
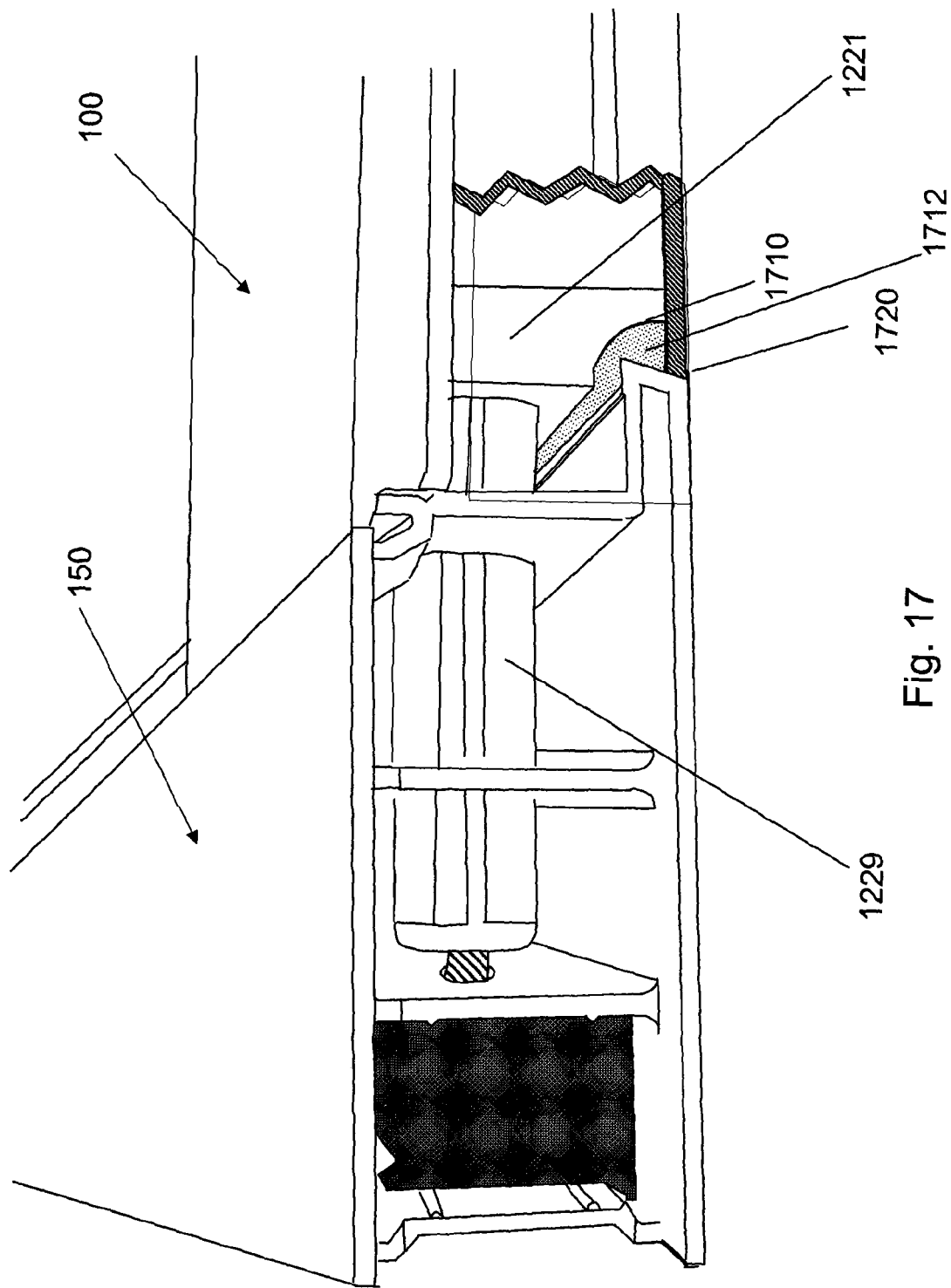
FIG. 17 portrays the assembled structure shown in FIG. 16, with a cutaway view of a channel for receiving a sealant for sealing an exterior joint.

Referring to FIG. 17, base plate 1221 of insert 1220 may be further adapted to provide one or more flow channels for the injection of sealants or adhesives. A particularly useful flow channel is channel 1710, which allows sealant 1712 to seal exterior joint 1720 between first member 100 and second member 150. After assembly, sealant 1712 can be injected into channel 1710 through a hole drilled at a suitably inconspicuous location, such as one that will later be covered by a glazing unit or other member. Suitable sealants can be chosen from commercially available flowable and curable materials, such as hot melt adhesives, or other sealing materials.

Figure 18:
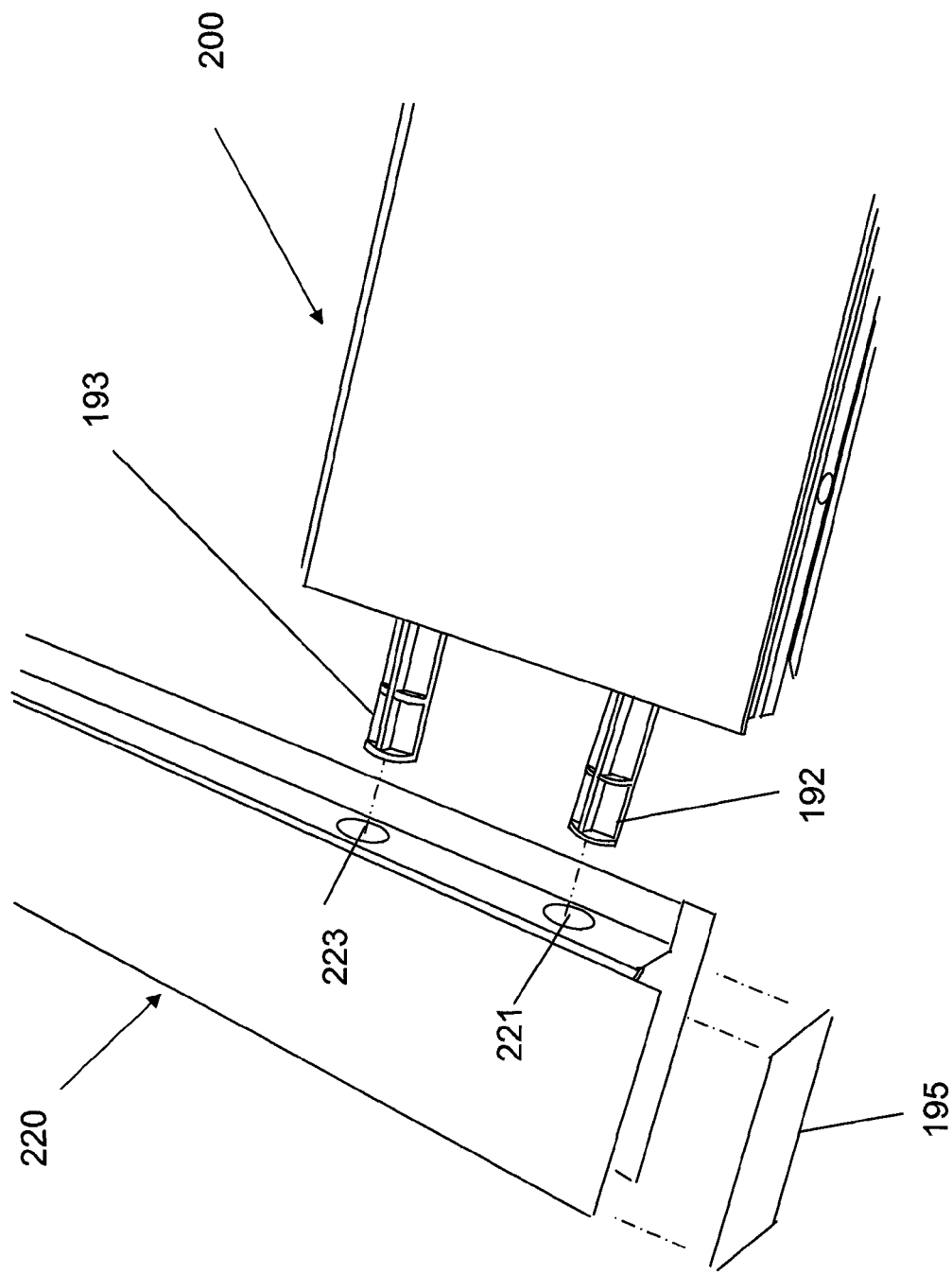
FIG. 18 portrays a structure having a coupling insert utilizing two tenon portions.
Figure 19:
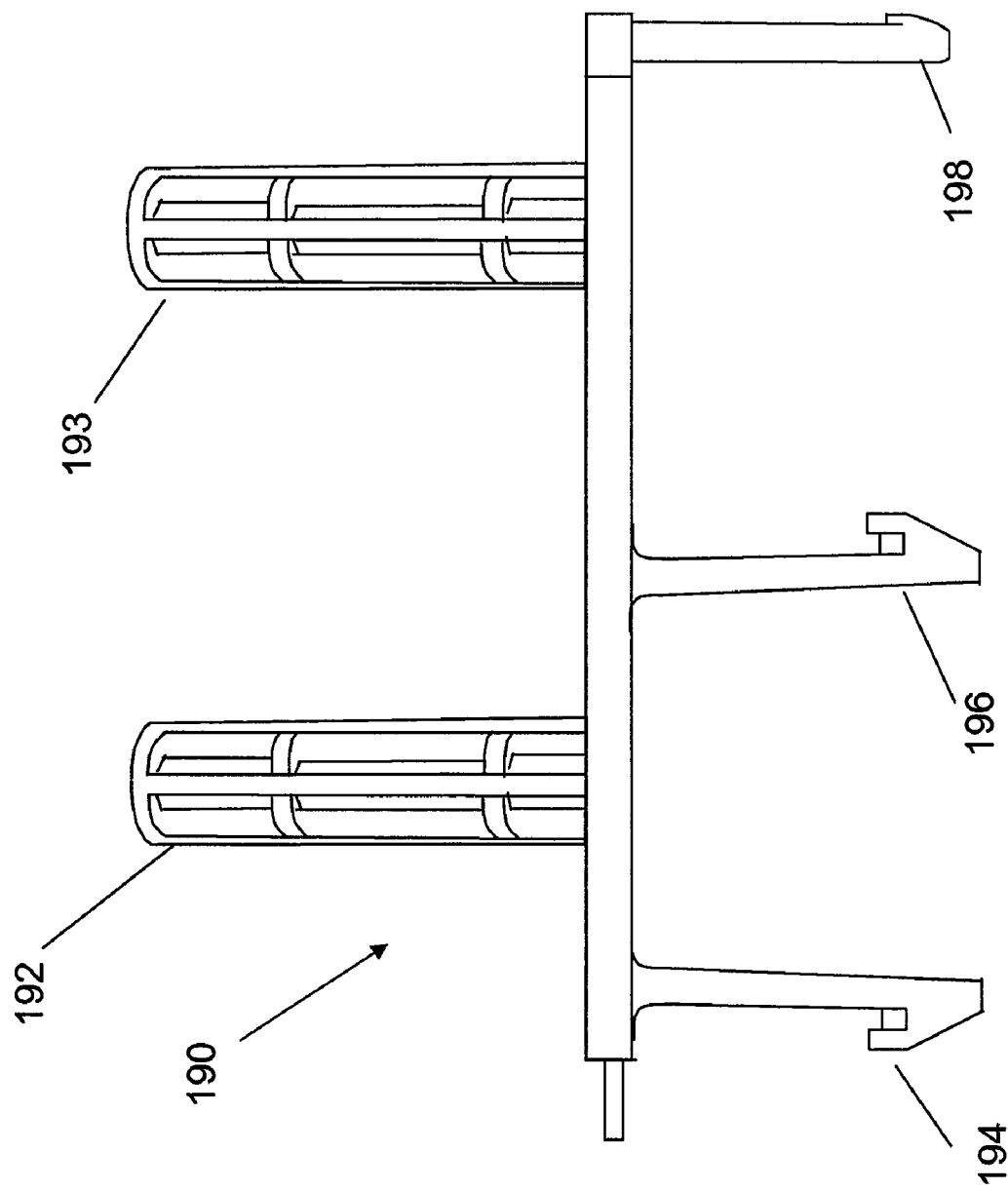
FIG. 19 portrays a coupling insert suitable for use in the structure shown in FIG. 18.

In another embodiment, portrayed in FIGS. 18 and 19, a wider first member 200 can be joined by a coupling member having two tenon portions 192 and 193, such as insert 190, shown in FIG. 19. Second member 220 is adapted to receive tenon portions 192 and 193 by providing two transverse openings 221 and 223. This embodiment is useful, for example, in a door panel having a bottom rail that is of greater height, in conformity with traditional door styling.

Bottom cover 195, shown in FIG. 18, can also be added to close the open end of member 220. Cover 195 can be held in place by conventional means, such as detents, screws, adhesives, combinations thereof, or other suitable fasteners. Cover 195 may also be provided with drain or vent holes to allow drainage of any water that may have leaked into the various members, and ventilation to allow drying and pressure relief.

Figure 20:
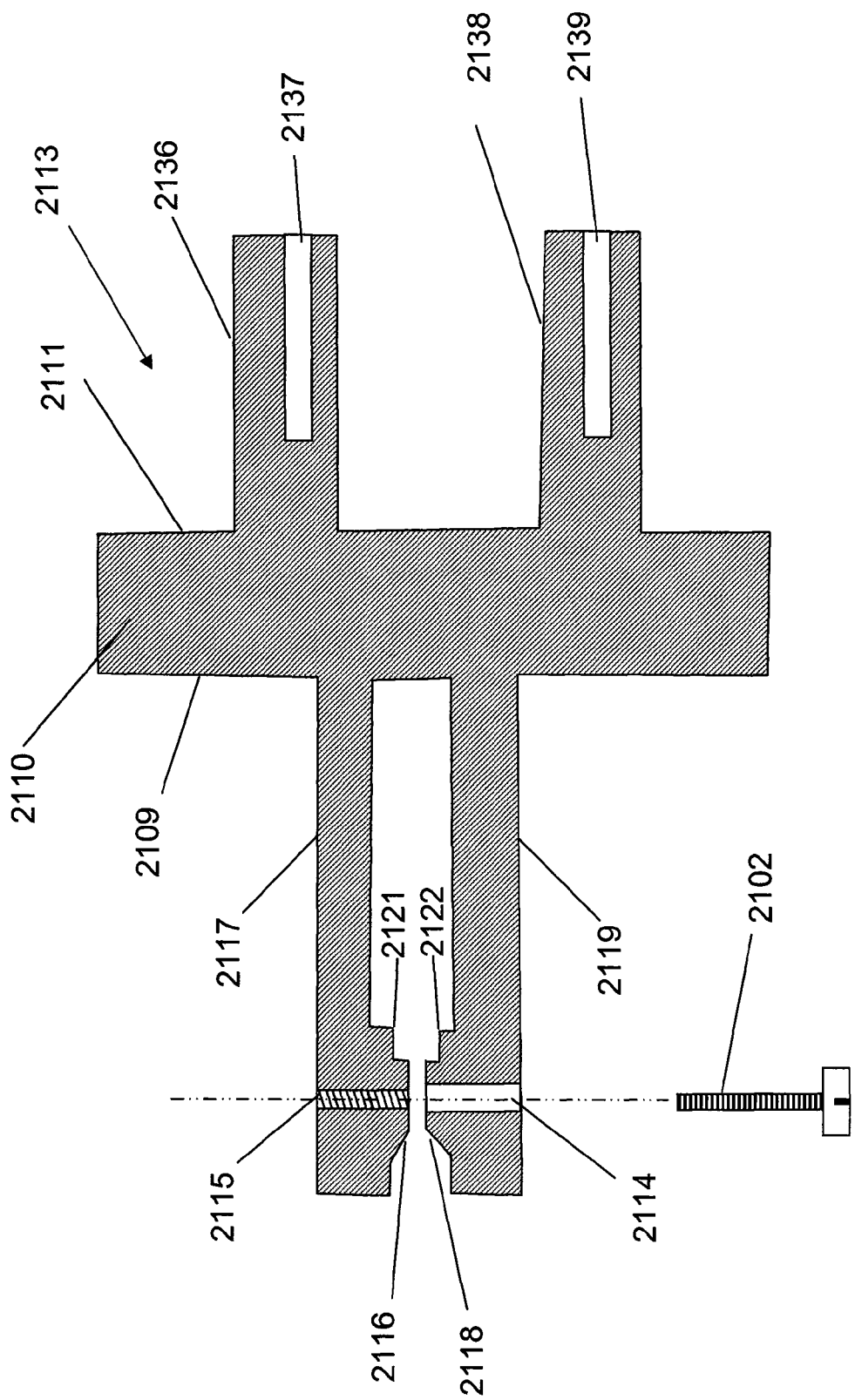
FIG. 20 portrays an alternative embodiment of a coupling insert.

Referring to FIG. 20, an alternative insert is portrayed. Insert 2113 comprises base plate 2110 having first side 2109 and second side 2111. Coupling arms 2117 and 2119 extend from first side 2109 and further incorporate bosses 2116 and 2118, respectively. Clearance hole 2114 extends through arm 2119, and concentric threaded hole 2115 extends through arm 2117, so that screw 2102 can pass through hole 2114 and be threaded into hole 2115. Alternatively, screw 2102 may be self threading. As will be apparent to one skilled in the art, threading may alternatively be provided by a threaded metal insert, or a nut. Insert 2113 can be conveniently made by injection molding of a thermoplastic material, though other materials and fabrication methods are also contemplated, as discussed hereinabove.

Figure 21:
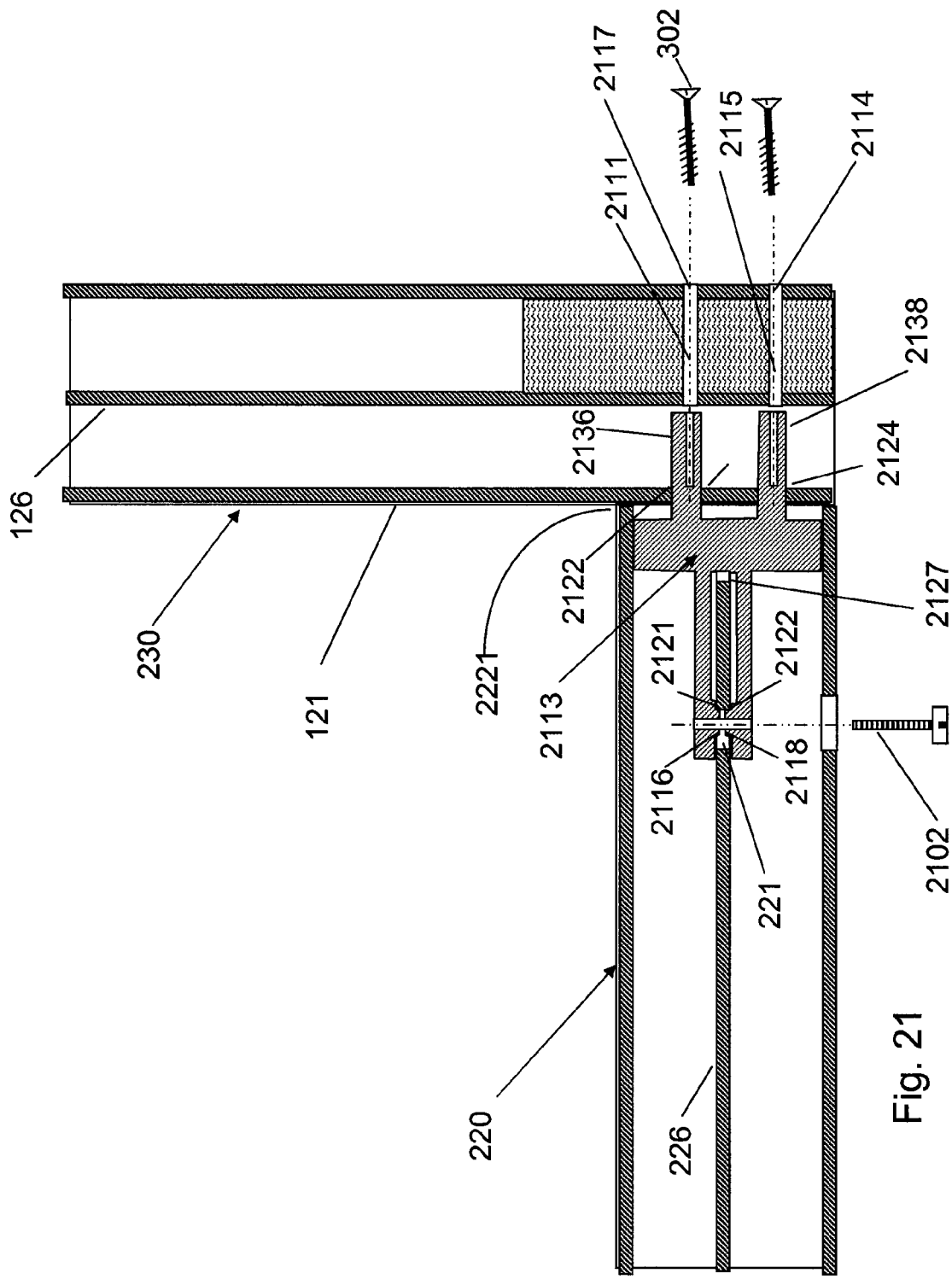
FIG. 21 is a sectional view of a structure utilizing the coupling insert shown in FIG. 20.

FIG. 21 shows the installation of insert 2113 in lineal member 220, and its use in coupling member 220 to member 230. Insert 2113 is slid into lineal member 220 until bosses 2116 and 2118 snap into opening 221. It will be noted that interior web 226 is cut back to surface 2127 to allow space for insert 2113. Screw 2102 is then installed to pinch clamping surfaces 2121 and 2122 together onto interior web 226. Clamping internal web 226 between surfaces 2121 and 2122 may improve the dimensional stability of the joint between members 220 and 230, and may further help to stabilize web 226 against crushing or tearout under conditions of heavy pulling on insert 2113, particularly when web 226 is relatively thin.

Figure 22:
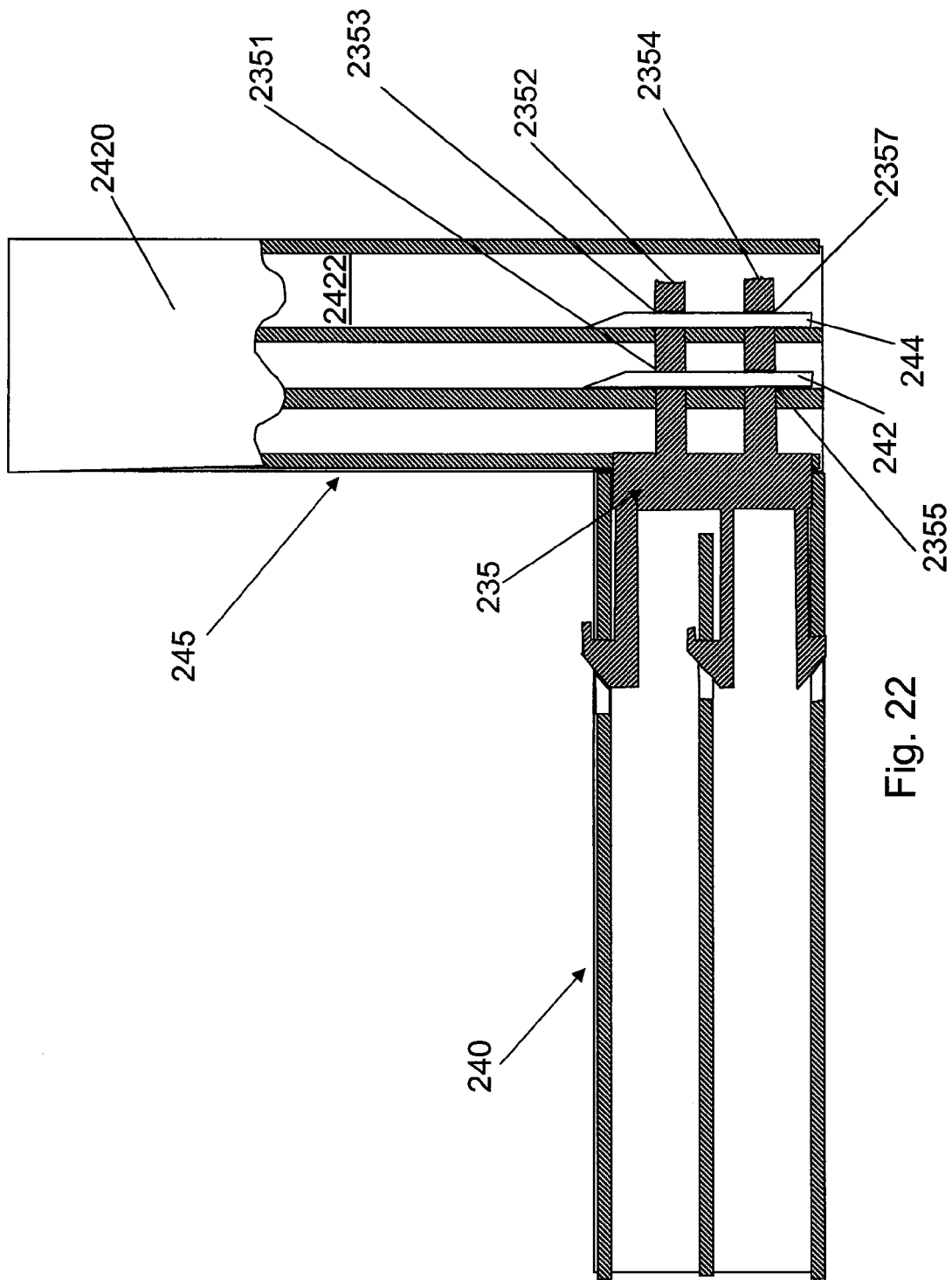
FIG. 22 portrays a structure utilizing an alternative embodiment of a coupling insert for coupling two hollow lineal members.
Figure 23:
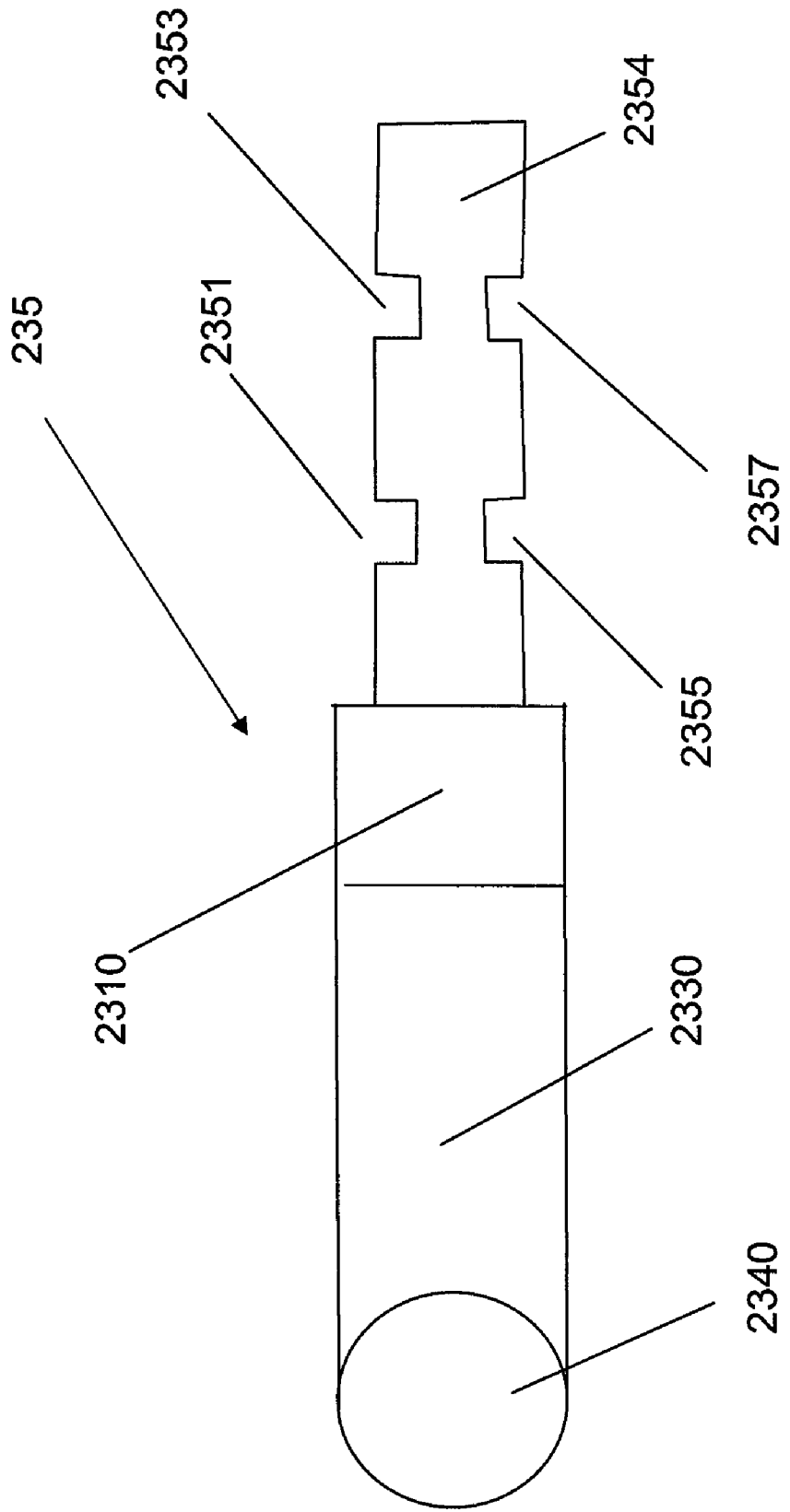
FIG. 23 is a side view of the coupling insert shown in FIG. 22.

Alternative embodiments are also contemplated for the attachment of the tenon portions of the inserts to the second member. In particular, screws 302 may be replaced by transverse wedging devices. Referring to FIGS. 22 and 23, insert 235 joins first member 240 to second member 245. Tenon portions 2352 and 2354 are provided with notches for receiving keys 242 and 244, which can be driven or pressed in from end 2311 of second member 245. Keys 242 and 244 can be provided in the form of two pronged forks, with one prong of key 242 engaging notch 2351 and the other prong engaging notch 2355. In like manner, one prong of key 244 engages notch 2353 and the other prong engages notch 2357. The reliability of the engagement can be improved by dimensioning the width of keys 242 and 244 sufficiently large to enable them to fit snugly against front wall 2420 and back wall 2422 of member 245.

Figure 24:
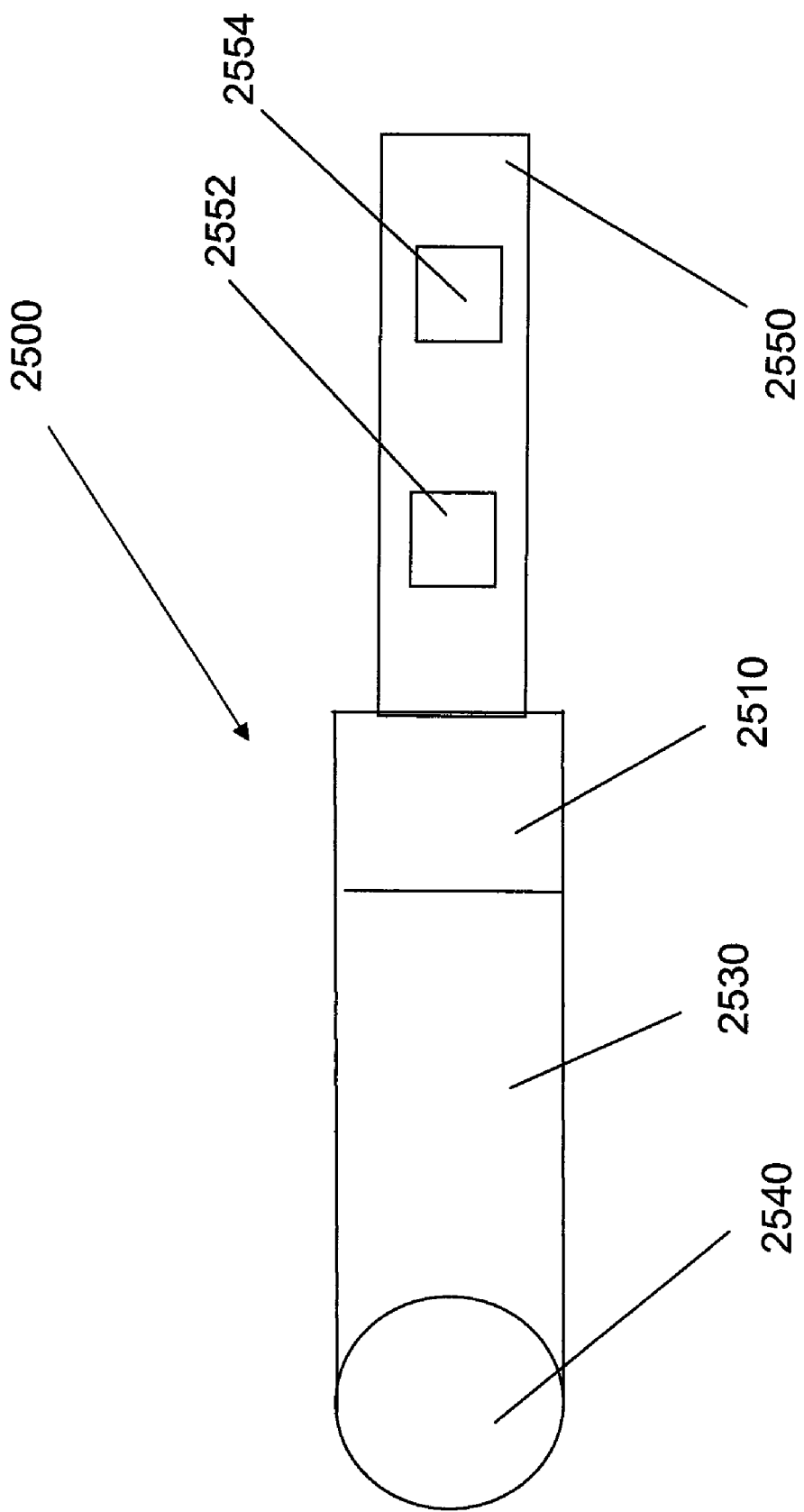
FIG. 24 portrays yet another embodiment of a coupling insert.

In yet another embodiment, portrayed in FIG. 24, tenon portion 2550 of insert 2500 is provided with openings 2552 and 2554, which are able to receive transverse keys that rest against webs of a lineal member to hold insert 2500 in place, thus forming a complete joint between two hollow lineal members.

Figure 25:
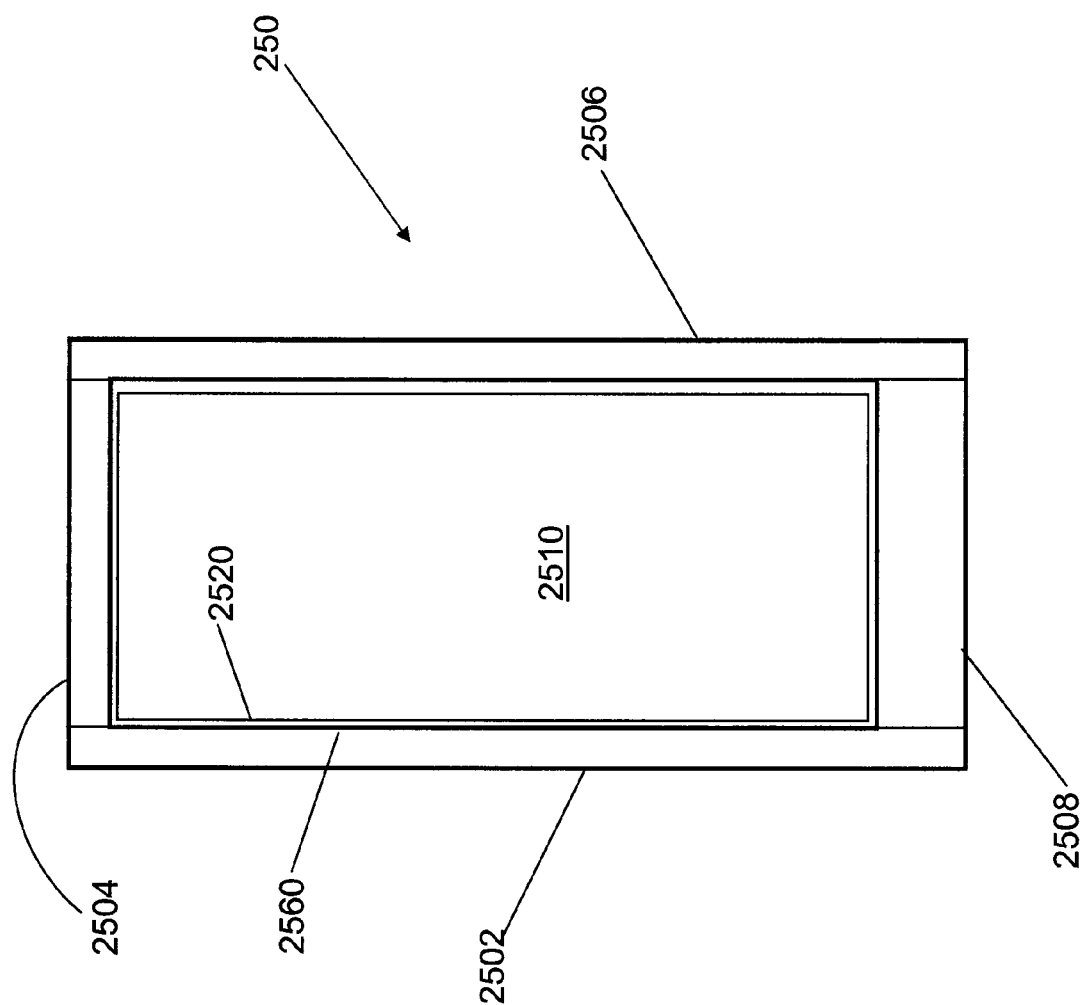
FIG. 25 portrays a door panel frame utilizing the joining structures disclosed herein.

Referring to FIG. 25, panel frame members 2502, 2504, 2506, and 2508 are hollow lineals of the type disclosed hereinabove and are joined in a side to end manner by the joining system disclosed hereinabove. First stile 2502 has been joined to bottom rail 2508, and this assembly has been joined to top rail 2504, to which second stile 2506 is then joined, to form a rectangular door panel frame defining opening 2510. Opening 2510 is further defined by bedding surface 2520 and edge wall 2560, which enable it to receive a glazing unit, thereby forming a windowed door.

Figure 26:
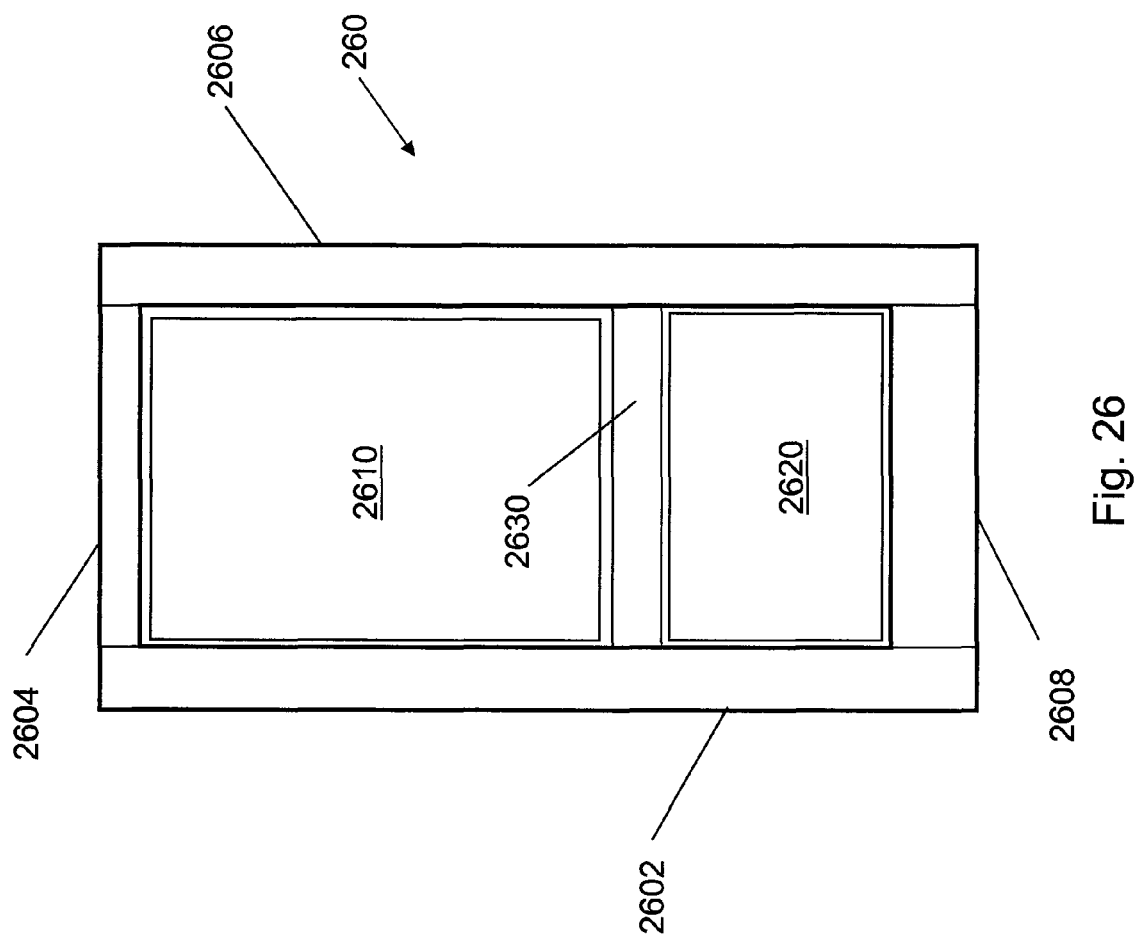
FIG. 26 portrays a door panel frame utilizing the joining structures disclosed herein and further incorporating a midrail.

The joining system disclosed herein can also be used for other parts of a door panel. Referring to FIG. 26, first stile 2602 is joined to bottom rail 2608, as well as to top rail 2604, thereby forming an assembly to which second stile 2606 is joined, thus forming a frame for a door panel. Rails 2604 and 2608 are hollow lineals of the type disclosed hereinabove, and are joined to stiles 2602 and 2606 by suitable adaptations of the joining system disclosed hereinabove. In the embodiment portrayed in FIG. 26, midrail 2630 is provided to improve the structural strength of door 260 and to define an upper opening 2610 and a lower opening 2620, either or both of which may be adapted to hold a glazing unit, a screen, an opaque panel, or other suitable component.

Figure 27:
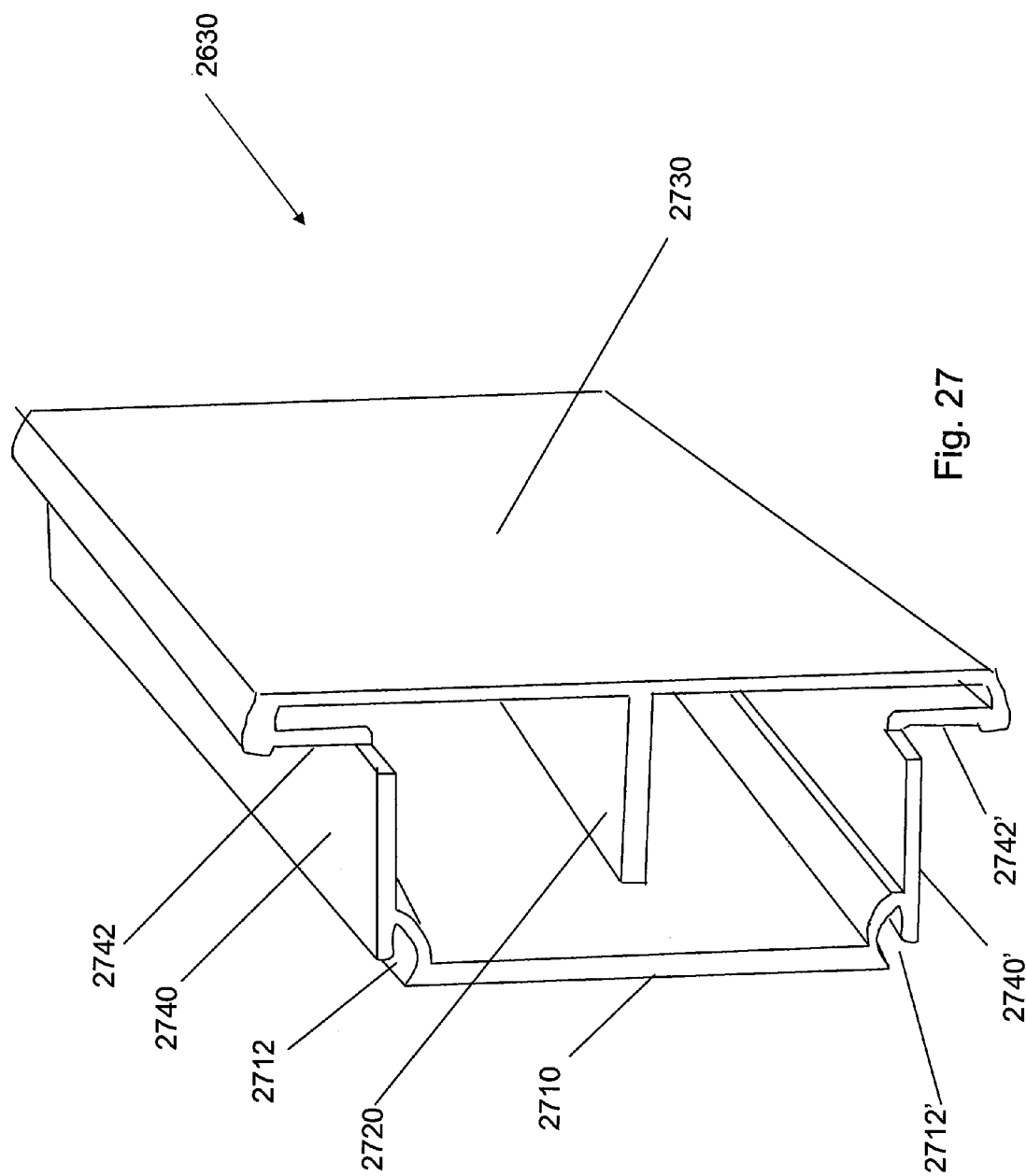
FIG. 27 portrays a cross sectional view of a hollow lineal member suitable for use as a midrail for the door panel frame portrayed in FIG. 26.

Referring to FIG. 27, midrail 2630 can have a cross sectional profile adapted to receive glazing units or other like members. Bedding surfaces 2742 and 2742' are adapted to match up with the bedding surfaces of the stiles and rails of door panel frame 260 so as to form continuous bedding surfaces surrounding openings 2610 and 2620, respectively. In like manner, edge walls 2740 and 2740' are adapted to match up with the edge walls of the rails and stiles of door panel 260 so as to form continuous edge walls around openings 2610 and 2620 respectively. The ends of midrail 2630 are fabricated to fit the profiles of stiles 2602 and 2606, in the manner that the ends of top and bottom rails 2604 and 2608 fit stiles 2602 and 2606. Midrail 2630 can be provided with inserts of the general type provided for top rail 2604, having baseplates adapted to be received by the internal profile of member 2630. Suitable openings can be provided in stiles 2602 and 2606 for receiving the tenon portions of the inserts, along with openings for screws for holding stiles 2602 and 2606 tightly against the ends of midrail 2630. Additionally, midrail 2630 can be provided with an internal core block for supporting screw head and other structural loads.

Figure 28:
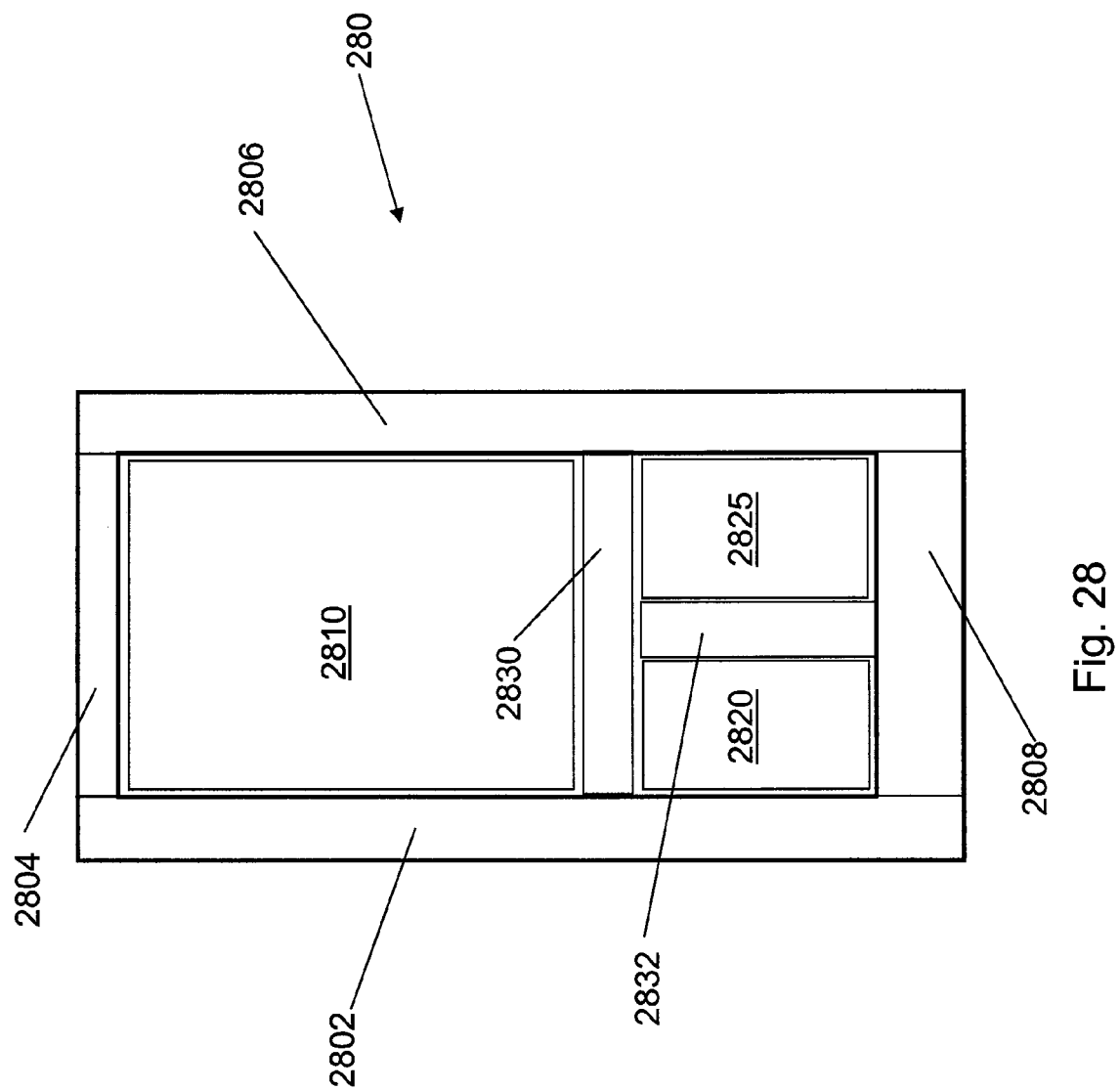
FIG. 28 portrays a door panel frame utilizing the joining structures disclosed herein and further incorporating a midrail and a center stile.

In yet another embodiment, portrayed in FIG. 28, center stile 2832 is provided, in addition to midrail 2830. Center stile 2832 can be provided with suitably fabricated ends and can be provided with inserts of the type disclosed hereinabove for holding midrail 2630 in place. Bottom rail 2808 and midrail 2830 can be provided with openings for receiving the tenon portions of the inserts from center stile 2832, as well as screws for holding the various members in place. It is useful for the openings in stiles 2802 and 2806 that receive the tenon portions of the inserts in midrail 2830 to be slightly elongated in the vertical direction, to allow midrail 2830 to adjust its position so as to fit tightly against center stile 2832. It will be appreciated that while midrail 2830 and center stile 2832 are portrayed in FIG. 28 as being of substantially the same width, this need not be the case. Center stile 2832 could, for example, be made narrower, so as to appear less bulky in relation to openings 2820 and 2825, if such a configuration appears desirable. Additionally, midrail 2830 can be provided with an internal core block for supporting screw loads and other structural loads.

While the use of hollow lineal members in the production of door panel frames provides many advantages, as disclosed hereinabove, still other advantages can be gained by filling the hollow spaces in the door panel frame with suitable filling materials, such as foam or other like material. Such materials can be provided in preformed shapes, such as flexible foam core blocks or fiberglass insulating bats, or injected as a reactive flowable material that expands to fill the hollow spaces in the panel. Combinations of preformed members and injected foam can also be used. Flowable foam materials are commercially available and can be formulated to provide such desirable performance properties as improved structural strength, heat insulation, air and moisture sealing, and sound deadening, as well as combinations thereof.

Figure 29:
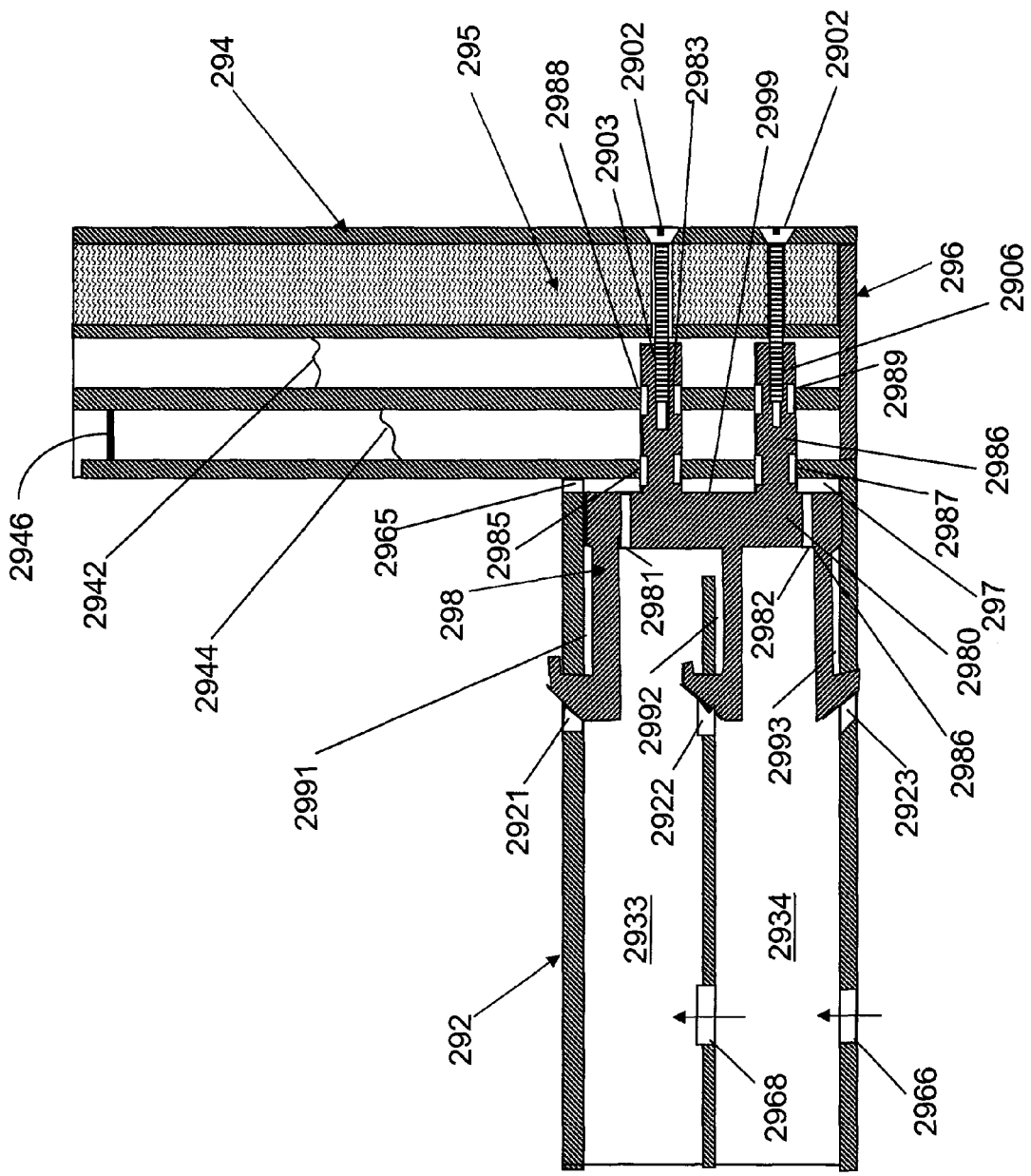
FIG. 29 is a sectional view of a structure using a coupling insert to join two lineal members, with provision for injecting a flowable foaming material.

Referring to FIG. 29, heat insulation can be improved by installing foam members in hollow spaces 2933 and 2934 of bottom rail 292 prior to installation of inserts 298. Such foam members can be preformed core blocks of flexible foam or rigid foam core blocks configured so that they do not interfere with the installation of inserts 298. It is contemplated that combinations of rigid and flexible foams may also be used. It may also be useful to attach foam pieces to insert 298 prior to installation into bottom rail 292. It is also contemplated that in some instances, fiberglass or other suitable non-foam insulation may be used to fill spaces 2933 and 2934.

In an alternative embodiment, hollow spaces 2933 and 2934 of bottom rail 292 can be injected with one of the commercially available flowable foams that cure to a solid, closed cell structure. One method of carrying out the injection is to first install a first insert 298 into a first end of rail 292, then install a second insert 298 into a second end of rail 292, and finally inject the reactive foaming composition through injection ports 2966 and 2968, which have been provided for this purpose. Apparatus for performing the injection is commercially available, for example from Graco Incorporated of Minneapolis, Minn., and typically comprises a gun-like device having an extended injector tube which can first extend through ports 2966 and 2968 to first inject foam into hollow space 2933, and then be retracted to inject foam into hollow space 2934. The injector tube is then retracted from rail 292 and port 2966 is plugged with an appropriate plugging member, such as a screw or snap-in plug. After injection, the foaming material reacts chemically, with the blowing agent contained in the foaming material generating gas bubbles that produce expansion of the foam, thereby producing flow of the material to various parts of hollow spaces 2933 and 2937. Simultaneously, the curing process proceeds to finally form a solid structure that substantially fills hollow spaces 2933 and 2934.

The simultaneous expansion, flow, and curing of the foam material is a complex process that entails significant unpredictability. Certain measures can be taken, however, to improve the quality of filling and hence the quality of the finished product. One such measure is to provide venting, so that air or other gases do not become trapped in pockets that might inhibit the expansion of foam into these areas, resulting in voids in the finished product. Openings 2921 and 2923 in rail 292, along with openings 2981 and 2982 in insert 298, serve as vents. Generally, it is useful for the vents to be as far as possible from the injection ports, and to be relatively small, compared to the size of the injection ports, so as to allow adequate exit of gases, but limited flow of foaming material. It will also be appreciated that some leakage of foaming material from the vents is usually acceptable, since leaked amounts of the types of foam typically used are easily scraped off or otherwise removed. It will further be appreciated that vents 2921, 2923, 2981, and 2982 are merely examples of vents that would be useful, and that further analysis or experimental runs of foaming may lead to more optimal venting arrangements.

Another measure that can be taken is to provide gaps between parts within the spaces to be foamed, wherein the gaps provide sufficient clearance to allow foam to more easily flow between and around parts, so as to maximize the contact area with all of the parts. Maximizing contact area is particularly useful when the foaming material exhibits adhesive properties. In particular, gaps 2991, 2992, and 2993 are provided to allow foam to flow between parts of insert 298 and the webs of rail 292, so as to provide increased bonding area between insert 298 and rail 292. More generally, if complex spaces are to be filled with foam, a useful principle is to provide flow paths with the maximum cross sectional area, so as to cause the minimum restriction to the flow of the foaming material.

In cases wherein the fit of insert 298 into rail 292 is relatively loose, so that movement of insert 298 relative to rail 292 is possible, it may be useful to provide a fixture for holding tenon portions 2983 and 2986 in a precisely determined position relative to rail 292 during foaming and curing, so as to produce a more precise product. Providing a predetermined looseness of fit, followed by fixturing and foaming, may be useful, in some instances, to compensate for manufacturing tolerances in rail 292 and insert 298.

Another type of fixturing may also be useful in some cases. Since the expansion of the foaming material can produce significant internal pressures in the spaces being filled, even with venting, there is the possibility that bulging and other distortions of the walls of the space being filled may occur. It is useful, in such instances, to provide clamping fixtures to hold the walls of the space in predetermined positions until curing has been completed.

An alternative method of injecting foaming material into rail 292 is to first install one insert 298, followed by injection of a measured amount of foaming material into hollow spaces 2933 and 2934 of rail 298, followed by quickly inserting the second insert, and allowing the foam to expand and cure. This method of foaming would have the advantage of avoiding injection ports and the subsequent need to plug them. It would also have the advantage of providing large venting areas, prior to insertion of second insert 298. It may further be useful to provide vents in second insert 298 to enable the final foam expansion to proceed to completion.

Suitable injectable foaming materials, such as reactive polyurethane foaming materials, are commercially available from a variety of sources, and foaming materials suitable for improving heat insulation, structural strength, sound attenuation, as well as other desirable properties, and combinations thereof, may be chosen from a variety of formulations, based upon foam manufacturer recommendations, as well as on the experience of those skilled in the art. Foam materials that are particularly useful are those that adhere well to the interior surfaces of rail 292 and insert 298, so as to enhance structural strength and rigidity of the assembled rail, as well as to seal the bottom rail assembly against moisture intrusion.

It is also useful to fill the stiles of a door panel frame with a foam material. Injection of foaming material into first stile 294 can be performed by several alternative methods. In one embodiment, bottom rail 292 is first produced as a foamed assembly comprising rail 292 and inserts 298, installed in each end by one of the methods described hereinabove. An assembled and foamed top rail is produced in a similar manner. First stile 294 is then prepared for assembly and foaming by first inserting core block 295, followed by drilling the appropriate holes to produce openings 2985, 2987, 2988, and 2989, for receiving tenon portions 2983 and 2986 of insert 298. Clearance holes are also drilled in stile 294, through core block 295, to receive screws 2902. In this embodiment, core block 295 extends for the full length of first stile 294. First stile 294 is then installed onto bottom rail 292 by insertion of tenon portions 2983 and 2986 into first into 2985 and 2987, and then into openings 2988 and 2989, so that the end of rail 292 engages the side of stile 294.

Figure 30:
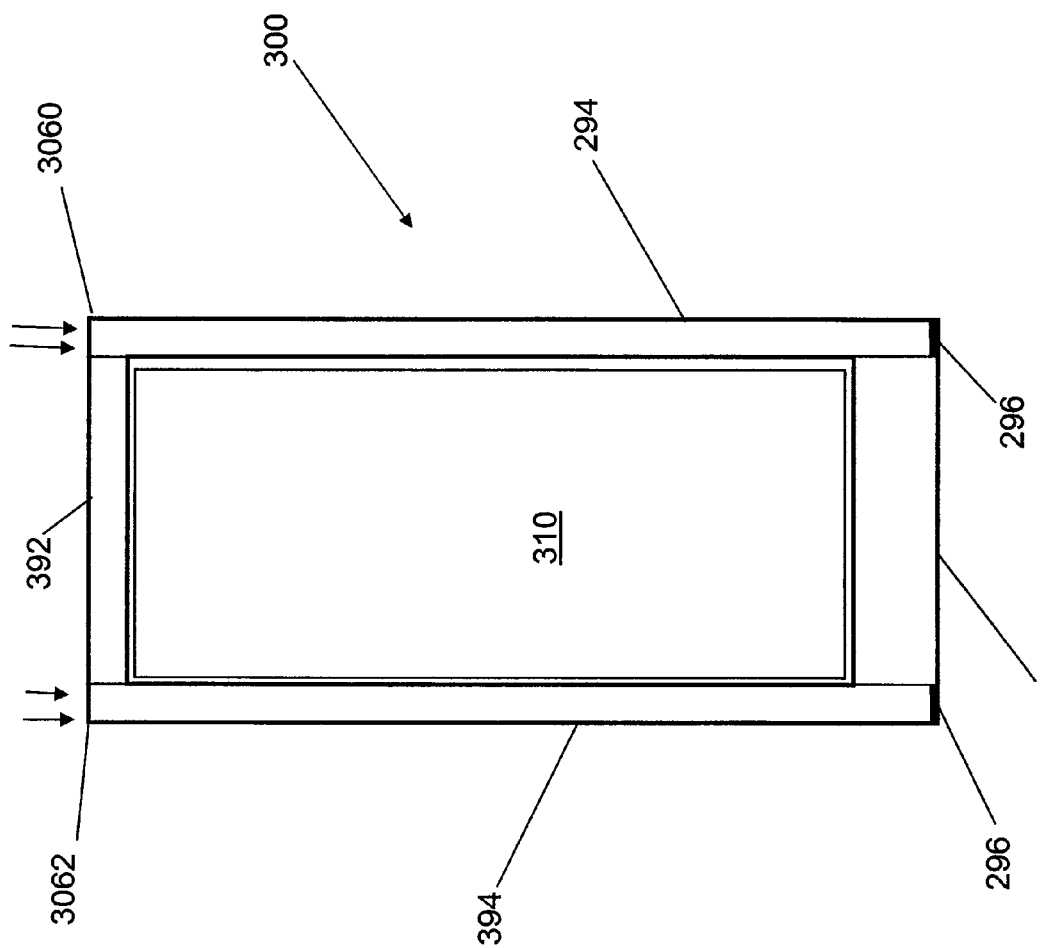
FIG. 30 portrays a door panel frame prepared for foam injection into the stiles.

Referring to FIG. 30, top rail 392 is installed onto stile 394 in a manner similar to installation of bottom rail 292. Finally, second stile 394 is installed onto rails 292 and 392. Assembly is completed by installing screws 2902 at the four corners of the frame to form completely assembled frame 300. Bottom covers 296 are then installed by attaching, for example, with screws extending into core blocks 295. Other attachment methods, involving detents, snaps, and other like devices, may also be used. It will be appreciated that the expansion of the foaming material may generate significant internal pressure in the stiles, so that the attachment of covers 296 may need to be fairly robust, as would be apparent to one skilled in the art.

In this embodiment, foaming is performed by injecting the foaming material into the top ends 3060 and 3062 of first and second stiles 294 and 394. A suitable apparatus for injecting the foam comprises a relatively long tube that extends for some distance into the stiles, with a foam source having sufficient pressure to project the foaming material to the bottom of each stile, and the capability of providing a measured quantity of foaming material. Once the foam has been injected, vented top covers can be installed onto top ends 3060 and 3062 of stiles 294 and 394, so that the foaming material can expand to fill the stiles and cure to a solid structure.

In yet another embodiment, stiles can be provided in extended stock lengths, from which two or more stiles can be cut. The stock lengths are first foamed and cured, after which individual stiles are cut from the foamed stock. Any inserted core blocks can be installed either before or after cutting to length. The stock lengths can be made somewhat longer than needed for the number of stiles to be cut, so that the end of the stock length, which includes the final free surface of the foam, can be discarded.

Referring again to FIG. 29, surface 2999 of base plate 2980 has been located at a slight distance from the side of stile 294, thereby creating gap 297, and allowing screws 2902 to pull rail 292 into tighter contact with stile 294, without interference from insert 298. Gap 297 may also be injected with a foaming material through, for example, opening 2965. A particularly useful type of foaming material is an expanding adhesive, many of which are commercially available. A method of producing an expanding adhesive from a conventional hot melt adhesive is disclosed in U.S. Pat. No. 4,778, 631, assigned to Nordson Corporation.

Door panel frames typically provide cavities or mortises for such things as locks and door closers. Such cavities can be created by partitioning off areas of the stiles or rails, prior to foaming, so as to exclude foam during the foaming process, or by filling the entire panel frame with foam, and using a router or other like device to remove foam and other material in the desired locations.

The invention has been described herein in terms of embodiments and methodologies considered by the inventors to be the best mode of carrying out the invention. It will be understood by those skilled in the art that various modifications, variations, changes and additions can be made to the illustrated embodiments without departing from the spirit and scope of the invention. For example, while lineal members have been illustrated in the embodiments described herein, other types and shapes may be provided so long as they incorporate at least some hollow portion for receiving and engaging coupling inserts with a coupling portion and a tenon portion. Further to the methods of firmly fastening the lineal members described herein, other suitable fasteners and/or adhesives are envisioned. The various components can have configurations other than the generally flat or planar configurations shown in the preferred embodiments, such as undulating, cupped, serrated, or the like. These and other modifications are possible and within the scope of the invention as set forth in the claims.

What is claimed is:

1. A structure, comprising:
    (a) first and second members, each of the members having opposed end portions, opposed side portions, internal peripheral profiles, external peripheral profiles, and defining substantially closed interior spaces;
    (b) an internal web within each of the first and second members, each internal web separating the interior space of the corresponding member into a first portion at least partially bounded by a side portion and a second portion at least partially bounded by the opposed side portion;
    (c) a coupling member adjoining the end portion of the first member to the side portion of the second member, the coupling member comprising an insert having:
        (i) a base plate having a first side and a second side and an external peripheral profile;
        (ii) a web coupling portion extending outwardly from the first side, wherein the web coupling portion further comprises an attachment portion, the web coupling portion being deformable to permit the attachment portion to flex from a fixed position to an installation position;
        (iii) a tenon portion extending outwardly from the second side, the tenon portion receiving therein a fastener that fastens the tenon portion to the second member; and
    (d) wherein the attachment portion engages within a web opening in the internal web in the first member, and the tenon portion is received by at least one opening in the second member, and extends into the first portion of the interior space of the second member; and
    a core member at least partially filling the second portion of the interior space opposite the tenon portion.

2. The structure of claim 1, wherein the first and second members comprise first and second lineal members.

3. The structure of claim 2 wherein the first and second members are coupled at right angles.

4. The structure of claim 3 wherein at least at least a portion of the external profile of the base plate is substantially the same as at least a portion of the internal profile of the first member, wherein the base plate is positioned within the first member.

5. The structure as claimed in claim 2 and wherein the fastener comprises at least one screw.

6. The structure as claimed in claim 5 and wherein the at least one screw extends through a side wall of the first lineal opposite the end of the second lineal and is threaded into the at least one tenon.

7. The structure as claimed in claim 6 and wherein the tenon portion extends partially through the interior space of the first lineal to a free end, and further comprising a core block disposed between a free end of the tenon portion and the side wall, the at least one screw extending through the core block.

8. The structure as claimed in claim 7 and further comprising a longitudinally extending partition within a substantially closed interior of the first lineal separating the interior into at least two portions, the core block being disposed in one of the portions.

9. The structure as claimed in claim 7 and further comprising a longitudinally extending partition within a substantially closed interior of the second lineal, the attachment portion being affixed to the partition.

10. The structure as claimed in claim 2 and further comprising a sealant between a side of the first lineal and an end of the second lineal.

11. The structure of claim 1 wherein the internal web of the first member is recessed inwardly from at least one of the end portions of the first member.

12. The structure of claim 1 further comprising an aperture formed in at least one of the opposed side portions.

13. The structure of claim 12 wherein the attachment portion is a detent portion for engaging at least one aperture in at least one of the opposed side edges and the web of the first member.

14. The structure of claim 12 wherein the attachment portion is at least one hook portion for engaging at least one aperture in at least one of the opposed side edges and the web of the first member.

15. The structure of claim 1 wherein the web coupling portion comprises at least one alignment arm.

16. The structure of claim 1 wherein the base plate includes a channel dimensioned to receive a flowable material between the adjoined first and second members.

17. The structure of claim 1 wherein the tenon portion is dimensioned to receive a fastener for holding the tenon portion in a fixed position when disposed through the at least one opening in the second member.

18. The structure of claim 17 wherein the tenon portion comprises an aperture for receiving a threaded fastener.

19. The structure of claim 1 wherein the first and second members comprise portions of a fenestration panel.

20. The structure of claim 1 further comprising third and fourth members, wherein the first, second, third, and fourth members define a door panel frame.

21. The structure of claim 20 wherein at least one of the members contains a foam material.

22. The structure of claim 20 wherein the door panel frame is substantially rectangular in shape.

23. The structure of claim 1 wherein the external profile of at least one of the first and second members is adapted to receive weather stripping.

24. The structure of claim 1 wherein the external profile of at least one of the first and second members is adapted to receive a glazing bead.

25. The structure as claimed in claim 1 and wherein the tenon portion comprises two tenons.

26. The structure as claimed in claim 25 and wherein each tenon is substantially cylindrical and the at least one opening is substantially round and sized to receive the at least one tenon.

* * * * *